United States Patent
Guan et al.

(10) Patent No.: US 10,764,015 B2
(45) Date of Patent: *Sep. 1, 2020

(54) FEEDBACK INFORMATION TRANSMISSION METHOD, RELATED DEVICE, AND COMMUNICATIONS SYSTEM

(71) Applicant: HUAWEI TECHNOLOGIES CO., LTD., Shenzhen, Guangdong (CN)

(72) Inventors: Lei Guan, Beijing (CN); Juan Zheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/185,278

(22) Filed: Nov. 9, 2018

(65) Prior Publication Data

US 2019/0081764 A1    Mar. 14, 2019

Related U.S. Application Data

(63) Continuation of application No. PCT/CN2016/081536, filed on May 10, 2016.

(51) Int. Cl.
*H04L 5/00* (2006.01)
*H04L 1/16* (2006.01)
(Continued)

(52) U.S. Cl.
CPC .............. *H04L 5/0055* (2013.01); *H04L 1/16* (2013.01); *H04L 1/1854* (2013.01);
(Continued)

(58) Field of Classification Search
CPC ... H04L 5/0053; H04L 5/0091; H04L 5/1438; H04L 5/0082; H04L 5/143; H04L 5/1469;
(Continued)

(56) References Cited

U.S. PATENT DOCUMENTS 8,830,883 B2 * 9/2014 Chen .................... H04L 5/0053
370/280
2017/0280430 A1 * 9/2017 Yin ................... H04W 72/0406

FOREIGN PATENT DOCUMENTS

CN        101114868 A    1/2008
CN        101873205 A    10/2010
(Continued)

OTHER PUBLICATIONS

3GPP TS 36.213 V13.1.1 (Mar. 2016),3rd Generation Partnership Project;Technical Specification Group Radio Access Network;Evolved Universal Terrestrial Radio Access (E-UTRA);Physical layer procedures(Release 13),total 361 pages.
(Continued)

*Primary Examiner* — Nishant Divecha
(74) *Attorney, Agent, or Firm* — Fish & Richardson P.C.

(57) ABSTRACT

The method disclosed in present embodiments includes: a terminal device receives downlink data in at least one downlink burst; determines that a first downlink subframe set is associated with a first uplink subframe, where the first downlink subframe set belongs to the at least one downlink burst, the first uplink subframe is used to send first feedback information corresponding to the first downlink subframe set, the first uplink subframe is in a first uplink burst, and the first uplink burst follows the at least one downlink burst; determines a first feedback information codebook, and determines the first feedback information based on the codebook; determines a first uplink channel in the first uplink subframe; and sends the first feedback information to the access network device on the first uplink channel. According to the method, the terminal device can properly sends ACK/NACK feedback information in a U-LTE scenario.

12 Claims, 14 Drawing Sheets

(51) Int. Cl.
*H04L 5/14* (2006.01)
*H04L 1/18* (2006.01)
*H04W 72/04* (2009.01)

(52) U.S. Cl.
CPC .......... *H04L 5/0082* (2013.01); *H04L 5/0092* (2013.01); *H04L 5/143* (2013.01); *H04L 5/1438* (2013.01); *H04L 5/1469* (2013.01); *H04W 72/0406* (2013.01); *H04W 72/0446* (2013.01); *H04L 5/001* (2013.01)

(58) Field of Classification Search
CPC ... H04L 5/001; H04L 1/16; H04L 1/18; H04L 5/0055; H04L 5/0057; H04W 72/00; H04W 74/00; H04W 24/10
See application file for complete search history.

(56) References Cited

FOREIGN PATENT DOCUMENTS

| CN | 104796232 A | 7/2015 |
|---|---|---|
| WO | 2012123437 A1 | 9/2012 |

OTHER PUBLICATIONS

International Search Report and Written Opinion issued in International Application No. PCT/CN2016/081536 dated Jan. 25, 2017, 19 pages.
3GPP TSG RAN WG1 meeting #84bis, R1-162469, LG Electronics:"PUCCH design in LAA", Busan, Korea, Apr. 11-15, 2016. 5 pages. XP51080207A.
3GPP TSG RAN WG1 Meeting #84bis, R1-162262, CATT:"UCI transmission for Rel-14 Elaa", Busan, Korea Apr. 11-15, 2016. 3 pages. XP51080067A.
Extended European Search Report issued in European Application No. 16901232.5 dated Apr. 2, 2019, 8 pages.

* cited by examiner

| Uplink/downlink configuration | Downlink-to-uplink switching period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1A

| Uplink/downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG. 1B

FEEDBACK INFORMATION TRANSMISSION METHOD, RELATED DEVICE, AND COMMUNICATIONS SYSTEM

CROSS-REFERENCE TO RELATED APPLICATIONS

This application is a continuation of International Application No. PCT/CN2016/081536, filed on May 10, 2016, the disclosure of which is hereby incorporated by reference in its entirety.

TECHNICAL FIELD

The present invention relates to the field of communications technologies, and in particular, to a feedback information transmission method, a related device, and a communications system.

BACKGROUND

A Long Term Evolution (LTE) system supports two duplex modes: frequency division duplex (FDD) and time division duplex (TDD). The FDD means that uplink transmission and downlink transmission are performed on different carrier frequency bands, and both a terminal device and an access network device are allowed to simultaneously receive and send signals. The TDD means that uplink transmission and downlink transmission are performed on a same carrier frequency band, and the terminal device/the access network device performs channel sending/receiving or receiving/sending at different time points. Based on the hybrid automatic repeat request (HARQ) mechanism, feedback information of the terminal device for a downlink carrier includes an acknowledgement (ACK) and a non-acknowledgement (NACK). In an existing LTE system, a subframe interval between a subframe used by a terminal device to receive a physical downlink shared channel (PDSCH) and an uplink subframe used by the terminal device to feed back an ACK or a NACK corresponding to the PDSCH is predefined. This ensures the feedback of the ACK or the NACK by the terminal device and receiving of the ACK or the NACK by an access network device.

In an FDD system, after receiving, in a downlink subframe n−4, downlink data carried by a PDSCH, the terminal device may feed back, in an uplink subframe n, an ACK or a NACK corresponding to the PDSCH. In a TDD system, an uplink/downlink configuration of a radio frame is fixed. As shown in FIG. 1A, the LTE system currently supports seven different TDD uplink/downlink configurations. D indicates a downlink subframe. S indicates a special subframe (SSF). U indicates an uplink subframe. FIG. 1B shows a time sequence relationship or a timing relationship between a PDSCH and a corresponding ACK or NACK. A subframe marked with a number is an uplink subframe n used to feed back an ACK or a NACK. The marked number indicates that an ACK or a NACK corresponding to a PDSCH in a downlink subframe set including a downlink subframe n−k (k belongs to K) needs to be fed back in the uplink subframe n. For example, K={7, 6} when the uplink/downlink configuration is 1 and subframe number n=2 indicates that an uplink subframe n=2 is used to feed back an ACK or a NACK corresponding to PDSCHs in downlink subframes n−7 and n−6. Specifically, n−7 indicates a downlink subframe 5, and n−6 indicates a downlink subframe 6.

A spectrum deployed in a serving cell of the existing LTE system is a licensed spectrum, that is, can be used only by a network of an operator who purchases the licensed spectrum. An unlicensed spectrum (also referred to as a license-exempt spectrum) attracts increasing concern because the unlicensed spectrum does not need to be purchased and can be used by any operator. In the future, spectrum resources will be increasingly insufficient. This limits a service capability of the licensed spectrum-based LTE system. Therefore, use of the unlicensed spectrum in an LTE system is an evolution direction. The LTE system deployed on the unlicensed spectrum is referred to as an unlicensed Long Term Evolution (U-LTE) system.

Resource sharing in the unlicensed spectrum means that only restrictions on indicators such as transmit power and out-of-band leakage are specified for using a specific spectrum, and there are some additional coexistence policies and the like in some areas. Considering friendly multi-system coexistence in the unlicensed spectrum, such as coexistence of a U-LTE system with a Wireless Fidelity (WiFi) system or coexistence of U-LTE systems of a plurality of operators, restrictions of some coexistence regulations such as listen before talk (LBT) need to be followed when the unlicensed spectrum is used. Specifically, before sending a signal on a spectrum deployed in a U-LTE serving cell, an access network device or a terminal device needs to perform clear channel assessment (CCA) on the spectrum deployed in the serving cell. The access network device or the terminal device temporarily cannot send a signal on the channel once a detected receive power exceeds a threshold. The access network device or the terminal device can send a signal on the channel only after detecting that the channel is idle. In some cases, the access network device or the terminal device further needs to perform random backoff. The channel is idle and a signal can be sent on the channel only in a time period of the random backoff. Based on this, it may be learned that, for the LTE system, data transmission in the unlicensed spectrum is opportunity-based for both the access network device sending downlink data and the terminal device sending uplink data. In addition, based on the opportunity-based data transmission in the unlicensed spectrum, an uplink/downlink configuration of the U-LTE system in the unlicensed spectrum may be flexible, to adapt to uplink and downlink service requirements of the LTE system.

Based on the foregoing features of the unlicensed spectrum (the opportunity-based data transmission and the flexible uplink/downlink configuration), a predefined timing relationship between a PDSCH and a HARQ-ACK in the prior art is difficult to ensure in the unlicensed spectrum. Because the CCA mechanism is used, it cannot be ensured that the terminal device can obtain an unlicensed spectrum resource through contention in an uplink subframe determined based on the predefined timing relationship. In addition, from a perspective of a flexible uplink/downlink configuration structure, for example, for the FDD system, it cannot be ensured in the U-LTE system that a subframe which has an fixed interval of four subframes following a subframe start boundary of a downlink subframe is an uplink subframe. For another example, for the TDD system, because the U-LTE system uses the flexible uplink/downlink configuration instead of the TDD uplink/downlink configuration in FIG. 1A, the U-LTE system cannot use the timing relationship defined in FIG. 1B for uplink ACK/NACK feedback in each TDD uplink/downlink configuration.

A technical problem that needs to be resolved currently is how to ensure that the terminal device sends ACK/NACK feedback information to the access network device based on an actual scheduling situation in a U-LTE scenario.

SUMMARY

Embodiments of the present invention provide a feedback information transmission method, a related device, and a communications system, to ensure that a terminal device can properly send ACK/NACK feedback information in a U-LTE scenario and to avoid wasting resources.

According to a first aspect, a feedback information transmission method is provided, and the method includes:

receiving, by a terminal device in a downlink subframe of at least one downlink burst, downlink data sent by an access network device;

determining, by the terminal device, that a first downlink subframe set is associated with a first uplink subframe, where the first downlink subframe set belongs to the at least one downlink burst, the first uplink subframe is used to send first feedback information corresponding to downlink data in the first downlink subframe set, the first uplink subframe is in a first uplink burst, and the first uplink burst follows the at least one downlink burst;

determining, by the terminal device, a first feedback information codebook, and determining the first feedback information based on the first feedback information codebook;

determining, by the terminal device, a first uplink channel in the first uplink subframe; and sending, by the terminal device, the first feedback information to the access network device on the first uplink channel.

By performing the method described in the first aspect, the terminal device determines, based on the received first downlink subframe set, the first uplink subframe associated with the first downlink subframe set, and further transmits, in the first uplink subframe, the feedback information corresponding to the first downlink subframe set. This can meet a flexible uplink/downlink configuration in a U-LTE system, and can ensure that the terminal device properly sends ACK/NACK feedback information in a U-LTE scenario. In addition, the first uplink subframe carries feedback information corresponding to a plurality of pieces of downlink data, thereby improving transmission resource utilization and avoiding wasting resources.

With reference to the first aspect, in a first implementation of the first aspect, the method further includes:

determining, by the terminal device, that a second downlink subframe set is associated with a second uplink subframe, where the second downlink subframe set belongs to the at least one downlink burst, the first downlink subframe set is a subset of the second downlink subframe set, the second uplink subframe is used to send second feedback information corresponding to downlink data in the second downlink subframe set, the second uplink subframe is in the first uplink burst, and the second uplink subframe follows the first uplink subframe;

determining, by the terminal device, a second feedback information codebook, and determining the second feedback information based on the second feedback information codebook;

determining, by the terminal device, a second uplink channel in the second uplink subframe; and sending, by the terminal device, the second feedback information to the access network device on the second uplink channel.

According to the foregoing steps, compared with the prior art in which feedback information associated with scheduled downlink data is fed back in only one uplink subframe, the steps can enhance a feedback information transmission opportunity, thereby improving a probability of successful feedback information transmission.

With reference to the first implementation of the first aspect, in a second implementation of the first aspect, before the sending, by the terminal device, the second feedback information to the access network device on the second uplink channel, the method further includes:

receiving, by the terminal device, overlapping codebook indication information sent by the access network device; and determining, by the terminal device based on the overlapping codebook indication information, the second downlink subframe set associated with the second uplink subframe.

According to the foregoing steps, content transmitted in the second feedback information may be determined based on a probability of successfully transmitting the first feedback information. This not only can ensure transmission of the first feedback information, but also can reduce as many overheads as possible for transmitting the second feedback information in the second uplink subframe.

With reference to the first aspect, in a third implementation of the first aspect, the method further includes:

determining, by the terminal device, that a third downlink subframe set is associated with a third uplink subframe, where the third downlink subframe set belongs to the at least one downlink burst, the third downlink subframe set does not overlap with the first downlink subframe set, the third uplink subframe is used to send third feedback information corresponding to downlink data in the third downlink subframe set, the third uplink subframe is in the first uplink burst or the third uplink subframe is in an uplink burst following the first uplink burst, and the third uplink subframe follows the first uplink subframe;

determining, by the terminal device, a third feedback information codebook, and determining the third feedback information based on the third feedback information codebook;

determining, by the terminal device, a third uplink channel in the third uplink subframe; and sending, by the terminal device, the third feedback information to the access network device on the third uplink channel.

According to the foregoing steps, feedback information corresponding to downlink data included in the at least one downlink burst may be fed back in the third uplink subframe in addition to the first uplink subframe. Compared with that all feedback information corresponding to the downlink data included in the at least one downlink burst is fed back in the first uplink subframe, this can reduce overheads of feedback information included in the first uplink subframe, and can ensure, as much as possible, transmission of the feedback information corresponding to the downlink data included in the at least one downlink burst. This is because if all feedback information corresponding to the downlink data included in the at least one downlink burst is fed back in the first uplink subframe, and the terminal device does not obtain an unlicensed frequency band resource through contention in the first uplink subframe, the feedback information corresponding to the downlink data included in the at least one downlink burst cannot be transmitted. In this case, the terminal device determines the third uplink subframe. This can ensure, as much as possible, transmission of some feedback information corresponding to the downlink data included in the at least one downlink burst.

With reference to the third implementation of the first aspect, in a fourth implementation of the first aspect, before the sending, by the terminal device, the third feedback information to the access network device on the third uplink channel, the method further includes:

receiving, by the terminal device, overlapping codebook indication information sent by the access network device; and determining, by the terminal device based on the overlapping codebook indication information, the third downlink subframe set associated with the third uplink subframe.

According to the foregoing steps, content transmitted in the third feedback information may be determined based on the probability of successfully transmitting the first feedback information. This can reduce as many overheads as possible for transmitting the third feedback information in the third uplink subframe.

With reference to any one of the first aspect or the implementations of the first aspect, in a fifth implementation of the first aspect, before the sending, by the terminal device, the first feedback information to the access network device on the first uplink channel, the method further includes:

receiving, by the terminal device, feedback information bearer indication information sent by the access network device, where the feedback information bearer indication information is used to indicate whether the terminal device sends the first feedback information on the first uplink channel.

According to the foregoing steps, resource overheads for transmitting the first feedback information in the first uplink subframe can be reduced, and data transmission efficiency can be ensured.

With reference to any one of the first aspect or the implementations of the first aspect, in a sixth implementation of the first aspect, the determining, by the terminal device, that a first downlink subframe set is associated with a first uplink subframe includes:

determining, by the terminal device based on downlink subframe configuration indication information corresponding to each of the at least one downlink burst and a timing relationship between downlink data and feedback information, that the first downlink subframe set is associated with the first uplink subframe.

According to the foregoing steps, the terminal device can reliably detect the first downlink subframe set, and can further transmit correct first feedback information in the first uplink subframe.

With reference to the sixth implementation of the first aspect, in a seventh implementation of the first aspect, the downlink subframe configuration indication information is included in a last downlink subframe and/or a penultimate downlink subframe in each of the at least one downlink burst.

With reference to the sixth implementation of the first aspect or the seventh implementation of the first aspect, in an eighth implementation of the first aspect, the downlink subframe configuration indication information is used to indicate a quantity of downlink subframes in a downlink burst in which the downlink subframe configuration indication information is located.

With reference to the first implementation of the first aspect, in a ninth implementation of the first aspect, the determining, by the terminal device, that a second downlink subframe set is associated with a second uplink subframe includes:

determining, by the terminal device based on downlink subframe configuration indication information corresponding to each of the at least one downlink burst and a timing relationship between downlink data and feedback information, that the second downlink subframe set is associated with the second uplink subframe.

According to the foregoing steps, the terminal device can reliably detect the second downlink subframe set, and can further transmit correct second feedback information in the second uplink subframe.

With reference to the third implementation of the first aspect, in a tenth implementation of the first aspect, the determining, by the terminal device, that a third downlink subframe set is associated with a third uplink subframe includes:

determining, by the terminal device based on downlink subframe configuration indication information corresponding to each of the at least one downlink burst and a timing relationship between downlink data and feedback information, that the third downlink subframe set is associated with the third uplink subframe.

According to the foregoing steps, the terminal device can reliably detect the third downlink subframe set, and can further transmit correct third feedback information in the third uplink subframe.

According to a second aspect, a feedback information transmission method is provided, and the method includes:

sending, by an access network device, downlink data to a terminal device in a downlink subframe of at least one downlink burst; and receiving, by the access network device on a first uplink channel in a first uplink subframe, first feedback information sent by the terminal device, where the first uplink subframe is associated with a first downlink subframe set, the first downlink subframe set belongs to the at least one downlink burst, the first feedback information is corresponding to downlink data in the first downlink subframe set, the first uplink subframe is in a first uplink burst, and the first uplink burst follows the at least one downlink burst.

By performing the method described in the second aspect, the terminal device determines, based on the received first downlink subframe set, the first uplink subframe associated with the first downlink subframe set, and further transmits, in the first uplink subframe, the feedback information corresponding to the first downlink subframe set. This can meet a flexible uplink/downlink configuration in a U-LTE system, and can ensure that the terminal device properly sends ACK/NACK feedback information in a U-LTE scenario. In addition, the first uplink subframe carries feedback information corresponding to a plurality of pieces of downlink data, thereby improving transmission resource utilization and avoiding wasting resources.

With reference to the second aspect, in a first implementation of the second aspect, the method further includes:

receiving, by the access network device on a second uplink channel in a second uplink subframe, second feedback information sent by the terminal device, where the second uplink subframe is associated with a second downlink subframe set, the second downlink subframe set belongs to the at least one downlink burst, the first downlink subframe set is a subset of the second downlink subframe set, the second feedback information is corresponding to downlink data in the second downlink subframe set, the second uplink subframe is in the first uplink burst, and the second uplink subframe follows the first uplink subframe.

According to the foregoing steps, compared with the prior art in which feedback information associated with scheduled downlink data is fed back in only one uplink subframe, the steps can enhance a feedback information transmission opportunity, thereby improving a probability of successful feedback information transmission.

With reference to the first implementation of the second aspect, in a second implementation of the second aspect, before the receiving, by the access network device on a second uplink channel in a second uplink subframe, second feedback information sent by the terminal device, the method further includes:

sending, by the access network device, overlapping codebook indication information to the terminal device, where the overlapping codebook indication information is used by the terminal device to determine the second downlink subframe set associated with the second uplink subframe.

According to the foregoing steps, content transmitted in the second feedback information may be determined based on a probability of successfully transmitting the first feedback information. This not only can ensure transmission of the first feedback information, but also can reduce as many overheads as possible for transmitting the second feedback information in the second uplink subframe.

With reference to the second aspect, in a third implementation of the second aspect, the method further includes:

receiving, by the access network device on a third uplink channel in a third uplink subframe, third feedback information sent by the terminal device, where the third uplink subframe is associated with a third downlink subframe set, the third downlink subframe set belongs to the at least one downlink burst, the third downlink subframe set does not overlap with the first downlink subframe set, the third feedback information is corresponding to downlink data in the third downlink subframe set, the third uplink subframe is in the first uplink burst or the third uplink subframe is in an uplink burst following the first uplink burst, and the third uplink subframe follows the first uplink subframe.

According to the foregoing operations, feedback information corresponding to downlink data included in the at least one downlink burst may be fed back in the third uplink subframe in addition to the first uplink subframe. Compared with that all feedback information corresponding to the downlink data included in the at least one downlink burst is fed back in the first uplink subframe, this can reduce overheads of feedback information included in the first uplink subframe, and can ensure, as much as possible, transmission of the feedback information corresponding to the downlink data included in the at least one downlink burst. This is because if all feedback information corresponding to the downlink data included in the at least one downlink burst is fed back in the first uplink subframe, and the terminal device does not obtain an unlicensed frequency band resource through contention in the first uplink subframe, the feedback information corresponding to the downlink data included in the at least one downlink burst cannot be transmitted. In this case, the terminal device determines the third uplink subframe. This can ensure, as much as possible, transmission of some feedback information corresponding to the downlink data included in the at least one downlink burst.

With reference to the third implementation of the second aspect, in a fourth implementation of the second aspect, before the receiving, by the access network device on a third uplink channel in a third uplink subframe, third feedback information sent by the terminal device, the method further includes:

sending, by the access network device, overlapping codebook indication information to the terminal device, where the overlapping codebook indication information is used by the terminal device to determine the third downlink subframe set associated with the third uplink subframe.

According to the foregoing operations, content transmitted in the third feedback information may be determined based on the probability of successfully transmitting the first feedback information. This can reduce as many overheads as possible for transmitting the third feedback information in the third uplink subframe.

With reference to any one of the second aspect or the implementations of the second aspect, in a fifth implementation of the second aspect, before the receiving, by the access network device on a first uplink channel in a first uplink subframe, first feedback information sent by the terminal device, the method further includes:

sending, by the access network device, feedback information bearer indication information to the terminal device, where the feedback information bearer indication information is used to indicate whether the terminal device sends the first feedback information on the first uplink channel in the first uplink subframe.

According to the foregoing steps, resource overheads for transmitting the first feedback information in the first uplink subframe can be reduced, and data transmission efficiency can be ensured.

With reference to any one of the second aspect or the implementations of the second aspect, in a sixth implementation of the second aspect, the method further includes:

sending, by the access network device, downlink subframe configuration indication information to the terminal device in a downlink subframe in each of the at least one downlink burst, where the downlink subframe configuration indication information is used by the terminal device to determine, based on the downlink subframe configuration indication information and a timing relationship between downlink data and feedback information, that the first downlink subframe set is associated with the first uplink subframe.

According to the foregoing operations, the terminal device can reliably detect the first downlink subframe set, and can further transmit correct first feedback information in the first uplink subframe.

With reference to the second aspect or any one of the implementations of the second aspect, in a seventh implementation of the second aspect, the downlink subframe configuration indication information is included in a last downlink subframe and/or a penultimate downlink subframe in each of the at least one downlink burst.

With reference to the second aspect or the sixth implementation of the second aspect or the seventh implementation of the second aspect, in an eighth implementation of the second aspect, the downlink subframe configuration indication information is used to indicate a quantity of downlink subframes in a downlink burst in which the downlink subframe configuration indication information is located.

With reference to the first implementation of the second aspect, in a ninth implementation of the second aspect, the method further includes:

sending, by the access network device, downlink subframe configuration indication information to the terminal device in a downlink subframe in each of the at least one downlink burst, where the downlink subframe configuration indication information is used by the terminal device to determine, based on the downlink subframe configuration indication information and a timing relationship between downlink data and feedback information, that the second downlink subframe set is associated with the second uplink subframe.

According to the foregoing operations, the terminal device can reliably detect the second downlink subframe set, and can further transmit correct second feedback information in the second uplink subframe.

With reference to the third implementation of the second aspect, in a tenth implementation of the second aspect, the method further includes:

sending, by the access network device, downlink subframe configuration indication information to the terminal device in a downlink subframe in each of the at least one downlink burst, where the downlink subframe configuration indication information is used by the terminal device to determine, based on the downlink subframe configuration indication information and a timing relationship between downlink data and feedback information, that the third downlink subframe set is associated with the third uplink subframe.

According to the foregoing operations, the terminal device can reliably detect the third downlink subframe set, and can further transmit correct third feedback information in the third uplink subframe.

According to a third aspect, a terminal device is provided, including a processor, a memory, and a communications module, where the memory is configured to store program code for transmitting feedback information, and the processor is configured to invoke the program code for transmitting feedback information, to perform the following operations:

receiving, by the processor by using the communications module in a downlink subframe of at least one downlink burst, downlink data sent by an access network device;

determining, by the processor, that a first downlink subframe set is associated with a first uplink subframe, where the first downlink subframe set belongs to the at least one downlink burst, the first uplink subframe is used to send first feedback information corresponding to downlink data in the first downlink subframe set, the first uplink subframe is in a first uplink burst, and the first uplink burst follows the at least one downlink burst;

determining, by the processor, a first feedback information codebook, and determining the first feedback information based on the first feedback information codebook;

determining, by the processor, a first uplink channel in the first uplink subframe; and sending, by the processor, the first feedback information to the access network device by using the communications module on the first uplink channel.

According to the foregoing operations, the terminal device determines, based on the received first downlink subframe set, the first uplink subframe associated with the first downlink subframe set, and further transmits, in the first uplink subframe, the feedback information corresponding to the first downlink subframe set. This can meet a flexible uplink/downlink configuration in a U-LTE system, and can ensure that the terminal device properly sends ACK/NACK feedback information in a U-LTE scenario. In addition, the first uplink subframe carries feedback information corresponding to a plurality of pieces of downlink data, thereby improving transmission resource utilization and avoiding wasting resources.

With reference to the third aspect, in a first implementation of the third aspect, the processor is further configured to:

determine, by the processor, that a second downlink subframe set is associated with a second uplink subframe, where the second downlink subframe set belongs to the at least one downlink burst, the first downlink subframe set is a subset of the second downlink subframe set, the second uplink subframe is used to send second feedback information corresponding to downlink data in the second downlink subframe set, the second uplink subframe is in the first uplink burst, and the second uplink subframe follows the first uplink subframe;

determine, by the processor, a second feedback information codebook, and determine the second feedback information based on the second feedback information codebook;

determine, by the processor, a second uplink channel in the second uplink subframe; and send, by the processor, the second feedback information to the access network device by using the communications module on the second uplink channel.

According to the foregoing operations, compared with the prior art in which feedback information associated with scheduled downlink data is fed back in only one uplink subframe, the steps can enhance a feedback information transmission opportunity, thereby improving a probability of successful feedback information transmission.

With reference to the first implementation of the third aspect, in a second implementation of the third aspect, before the processor sends the second feedback information to the access network device by using the communications module on the second uplink channel, the processor is further configured to:

receive, by the processor by using the communications module, overlapping codebook indication information sent by the access network device; and determine, by the processor based on the overlapping codebook indication information, the second downlink subframe set associated with the second uplink subframe.

According to the foregoing operations, content transmitted in the second feedback information may be determined based on a probability of successfully transmitting the first feedback information. This not only can ensure transmission of the first feedback information, but also can reduce as many overheads as possible for transmitting the second feedback information in the second uplink subframe.

With reference to the third aspect, in a third implementation of the third aspect, the processor is further configured to:

determine, by the processor, that a third downlink subframe set is associated with a third uplink subframe, where the third downlink subframe set belongs to the at least one downlink burst, the third downlink subframe set does not overlap with the first downlink subframe set, the third uplink subframe is used to send third feedback information corresponding to downlink data in the third downlink subframe set, the third uplink subframe is in the first uplink burst or the third uplink subframe is in an uplink burst following the first uplink burst, and the third uplink subframe follows the first uplink subframe;

determine, by the processor, a third feedback information codebook, and determine the third feedback information based on the third feedback information codebook;

determine, by the processor, a third uplink channel in the third uplink subframe; and send, by the processor, the third feedback information to the access network device by using the communications module on the third uplink channel.

According to the foregoing operations, feedback information corresponding to downlink data included in the at least one downlink burst may be fed back in the third uplink subframe in addition to the first uplink subframe. Compared with that all feedback information corresponding to the downlink data included in the at least one downlink burst is fed back in the first uplink subframe, this can reduce overheads of feedback information included in the first uplink subframe, and can ensure, as much as possible, transmission of the feedback information corresponding to the downlink data included in the at least one downlink burst. This is because if all feedback information corresponding to the downlink data included in the at least one downlink burst is fed back in the first uplink subframe, and the terminal device does not obtain an unlicensed frequency band resource through contention in the first uplink subframe, the feedback information corresponding to the downlink data included in the at least one downlink burst cannot be transmitted. In this case, the terminal device determines the third uplink subframe. This can ensure, as much as possible, transmission of some feedback information corresponding to the downlink data included in the at least one downlink burst.

With reference to the third implementation of the third aspect, in a fourth implementation of the third aspect, before the processor sends the third feedback information to the access network device by using the communications module on the third uplink channel, the processor is further configured to:

receive, by the processor by using the communications module, overlapping codebook indication information sent by the access network device; and determine, by the processor based on the overlapping codebook indication information, the third downlink subframe set associated with the third uplink subframe.

According to the foregoing operations, content transmitted in the third feedback information may be determined based on the probability of successfully transmitting the first feedback information. This can reduce as many overheads as possible for transmitting the third feedback information in the third uplink subframe.

With reference to any one of the third aspect or the implementations of the third aspect, in a fifth implementation of the third aspect, before the processor sends the first feedback information to the access network device by using the communications module on the first uplink channel, the processor is further configured to:

receive, by the processor by using the communications module, feedback information bearer indication information sent by the access network device, where the feedback information bearer indication information is used to indicate whether the terminal device sends the first feedback information on the first uplink channel.

According to the foregoing operations, resource overheads for transmitting the first feedback information in the first uplink subframe can be reduced, and data transmission efficiency can be ensured.

With reference to any one of the third aspect or the implementations of the third aspect, in a sixth implementation of the third aspect, the determining, by the processor, that a first downlink subframe set is associated with a first uplink subframe includes:

determining, by the processor based on downlink subframe configuration indication information corresponding to each of the at least one downlink burst and a timing relationship between downlink data and feedback information, that the first downlink subframe set is associated with the first uplink subframe.

According to the foregoing operations, the terminal device can reliably detect the first downlink subframe set, and can further transmit correct first feedback information in the first uplink subframe.

With reference to the sixth implementation of the third aspect, in a seventh implementation of the third aspect, the downlink subframe configuration indication information is included in a last downlink subframe and/or a penultimate downlink subframe in each of the at least one downlink burst.

With reference to the sixth implementation of the third aspect or the seventh implementation of the third aspect, in an eighth implementation of the third aspect, the downlink subframe configuration indication information is used to indicate a quantity of downlink subframes in a downlink burst in which the downlink subframe configuration indication information is located.

With reference to the first implementation of the third aspect, in a ninth implementation of the third aspect, the determining, by the processor, that a second downlink subframe set is associated with a second uplink subframe includes:

determining, by the processor based on downlink subframe configuration indication information corresponding to each of the at least one downlink burst and a timing relationship between downlink data and feedback information, that the second downlink subframe set is associated with the second uplink subframe.

According to the foregoing operations, the terminal device can reliably detect the second downlink subframe set, and can further transmit correct second feedback information in the second uplink subframe.

With reference to the third implementation of the third aspect, in a tenth implementation of the third aspect, the determining, by the processor, that a third downlink subframe set is associated with a third uplink subframe includes:

determining, by the processor based on downlink subframe configuration indication information corresponding to each of the at least one downlink burst and a timing relationship between downlink data and feedback information, that the third downlink subframe set is associated with the third uplink subframe.

According to the foregoing operations, the terminal device can reliably detect the third downlink subframe set, and can further transmit correct third feedback information in the third uplink subframe.

According to a fourth aspect, an access network device is provided, including a processor, a memory, and a communications module, where the memory is configured to store program code for transmitting feedback information, and the processor is configured to invoke the program code for transmitting feedback information, to perform the following operations:

sending, by the processor, downlink data to a terminal device by using the communications module in a downlink subframe of at least one downlink burst; and receiving, by the processor by using the communications module on a first uplink channel in a first uplink subframe, first feedback information sent by the terminal device, where the first uplink subframe is associated with a first downlink subframe set, the first downlink subframe set belongs to the at least one downlink burst, the first feedback information is corresponding to downlink data in the first downlink subframe set, the first uplink subframe is in a first uplink burst, and the first uplink burst follows the at least one downlink burst.

According to the foregoing operations, the terminal device determines, based on the received first downlink subframe set, the first uplink subframe associated with the first downlink subframe set, and further transmits, in the first uplink subframe, the feedback information corresponding to the first downlink subframe set. This can meet a flexible uplink/downlink configuration in a U-LTE system, and can ensure that the terminal device properly sends ACK/NACK feedback information in a U-LTE scenario. In addition, the first uplink subframe carries feedback information corresponding to a plurality of pieces of downlink data, thereby improving transmission resource utilization and avoiding wasting resources.

With reference to the fourth aspect, in a first implementation of the fourth aspect, the processor is further configured to:

receive, by using the communications module on a second uplink channel in a second uplink subframe, second feedback information sent by the terminal device, where the second uplink subframe is associated with a second downlink subframe set, the second downlink subframe set belongs to the at least one downlink burst, the first downlink subframe set is a subset of the second downlink subframe set, the second feedback information is corresponding to downlink data in the second downlink subframe set, the second uplink subframe is in the first uplink burst, and the second uplink subframe follows the first uplink subframe.

According to the foregoing operations, compared with the prior art in which feedback information associated with scheduled downlink data is fed back in only one uplink subframe, the steps can enhance a feedback information transmission opportunity, thereby improving a probability of successful feedback information transmission.

With reference to the first implementation of the fourth aspect, in a second implementation of the fourth aspect, before the processor receives, by using the communications module on the second uplink channel in the second uplink subframe, the second feedback information sent by the terminal device, the processor is further configured to:

send overlapping codebook indication information to the terminal device by using the communications module, where the overlapping codebook indication information is used by the terminal device to determine the second downlink subframe set associated with the second uplink subframe.

According to the foregoing operations, content transmitted in the second feedback information may be determined based on a probability of successfully transmitting the first feedback information. This not only can ensure transmission of the first feedback information, but also can reduce as many overheads as possible for transmitting the second feedback information in the second uplink subframe.

With reference to the fourth aspect, in a third implementation of the fourth aspect, the processor is further configured to:

receive, by using the communications module on a third uplink channel in a third uplink subframe, third feedback information sent by the terminal device, where the third uplink subframe is associated with a third downlink subframe set, the third downlink subframe set belongs to the at least one downlink burst, the third downlink subframe set does not overlap with the first downlink subframe set, the third feedback information is corresponding to downlink data in the third downlink subframe set, the third uplink subframe is in the first uplink burst or the third uplink subframe is in an uplink burst following the first uplink burst, and the third uplink subframe follows the first uplink subframe.

According to the foregoing operations, feedback information corresponding to downlink data included in the at least one downlink burst may be fed back in the third uplink subframe in addition to the first uplink subframe. Compared with that all feedback information corresponding to the downlink data included in the at least one downlink burst is fed back in the first uplink subframe, this can reduce overheads of feedback information included in the first uplink subframe, and can ensure, as much as possible, transmission of the feedback information corresponding to the downlink data included in the at least one downlink burst. This is because if all feedback information corresponding to the downlink data included in the at least one downlink burst is fed back in the first uplink subframe, and the terminal device does not obtain an unlicensed frequency band resource through contention in the first uplink subframe, the feedback information corresponding to the downlink data included in the at least one downlink burst cannot be transmitted. In this case, the terminal device determines the third uplink subframe. This can ensure, as much as possible, transmission of some feedback information corresponding to the downlink data included in the at least one downlink burst.

With reference to the third implementation of the fourth aspect, in a fourth implementation of the fourth aspect, before the processor receives, by using the communications module on the third uplink channel in the third uplink subframe, the third feedback information sent by the terminal device, the processor is further configured to:

send overlapping codebook indication information to the terminal device by using the communications module, where the overlapping codebook indication information is used by the terminal device to determine the third downlink subframe set associated with the third uplink subframe.

According to the foregoing operations, content transmitted in the third feedback information may be determined based on the probability of successfully transmitting the first feedback information. This can reduce as many overheads as possible for transmitting the third feedback information in the third uplink subframe.

With reference to any one of the fourth aspect or the implementations of the fourth aspect, in a fifth implementation of the fourth aspect, before the processor receives, by using the communications module on the first uplink channel in the first uplink subframe, the first feedback information sent by the terminal device, the processor is further configured to:

send feedback information bearer indication information to the terminal device by using the communications module, where the feedback information bearer indication information is used to indicate whether the terminal device sends the first feedback information on the first uplink channel in the first uplink subframe.

According to the foregoing operations, resource overheads for transmitting the first feedback information in the first uplink subframe can be reduced, and data transmission efficiency can be ensured.

With reference to any one of the fourth aspect or the implementations of the fourth aspect, in a sixth implementation of the fourth aspect, the processor is further configured to:

send downlink subframe configuration indication information to the terminal device by using the communications module in a downlink subframe in each of the at least one downlink burst, where the downlink subframe configuration indication information is used by the terminal device to determine, based on the downlink subframe configuration indication information and a timing relationship between downlink data and feedback information, that the first downlink subframe set is associated with the first uplink subframe.

According to the foregoing operations, the terminal device can reliably detect the first downlink subframe set, and can further transmit correct first feedback information in the first uplink subframe.

With reference to the sixth implementation of the fourth aspect, in a seventh implementation of the fourth aspect, the downlink subframe configuration indication information is included in a last downlink subframe and/or a penultimate downlink subframe in each of the at least one downlink burst.

With reference to the sixth implementation of the fourth aspect or the seventh implementation of the fourth aspect, in an eighth implementation of the fourth aspect, the downlink subframe configuration indication information is used to indicate a quantity of downlink subframes in a downlink burst in which the downlink subframe configuration indication information is located.

With reference to the first implementation of the fourth aspect, in a ninth implementation of the fourth aspect, the processor is further configured to:

send downlink subframe configuration indication information to the terminal device by using the communications module in a downlink subframe in each of the at least one downlink burst, where the downlink subframe configuration indication information is used by the terminal device to determine, based on the downlink subframe configuration indication information and a timing relationship between downlink data and feedback information, that the second downlink subframe set is associated with the second uplink subframe.

According to the foregoing operations, the terminal device can reliably detect the second downlink subframe set, and can further transmit correct second feedback information in the second uplink subframe.

With reference to the third implementation of the fourth aspect, in a tenth implementation of the fourth aspect, the processor is further configured to:

send downlink subframe configuration indication information to the terminal device by using the communications module in a downlink subframe in each of the at least one downlink burst, where the downlink subframe configuration indication information is used by the terminal device to determine, based on the downlink subframe configuration indication information and a timing relationship between downlink data and feedback information, that the third downlink subframe set is associated with the third uplink subframe.

According to the foregoing operations, the terminal device can reliably detect the third downlink subframe set, and can further transmit correct third feedback information in the third uplink subframe.

According to a fifth aspect, a terminal device is provided, and the terminal device includes modules or units that are configured to perform the feedback information transmission method described in any one of the first aspect or the implementations of the first aspect.

According to a sixth aspect, an access network device is provided, and the access network device includes modules or units that are configured to perform the feedback information transmission method described in any one of the second aspect or the implementations of the second aspect.

According to a seventh aspect, a communications system is provided, and the communications system includes the terminal device according to the third aspect or the fifth aspect and the access network device according to the fourth aspect or the sixth aspect.

According to an eighth aspect, a computer readable storage medium is provided, and the readable storage medium stores program code for implementing the feedback information transmission method described in any one of the first aspect or the implementations of the first aspect, and the program code includes an execution instruction for running the feedback information transmission method.

According to a ninth aspect, a computer readable storage medium is provided, and the readable storage medium stores program code for implementing the feedback information transmission method described in any one of the second aspect or the implementations of the second aspect, and the program code includes an execution instruction for running the feedback information transmission method.

BRIEF DESCRIPTION OF DRAWINGS

To describe the technical solutions in the embodiments of the present invention more clearly, the following briefly describes the accompanying drawings required for describing the embodiments.

FIG. 1A is a schematic diagram of different TDD uplink/downlink configurations in an LTE system;

FIG. 1B is a schematic diagram of a time sequence relationship between a PDSCH and an ACK/NACK corresponding to the PDSCH in an LTE TDD system;

DESCRIPTION OF EMBODIMENTS

Terms used in the description of embodiments of the present invention are merely intended to explain specific embodiments of the present invention, but are not intended to limit the present invention. The following clearly describes the technical solutions in the embodiments of the present invention with reference to the accompanying drawings in the embodiments of the present invention.

Figure 2:
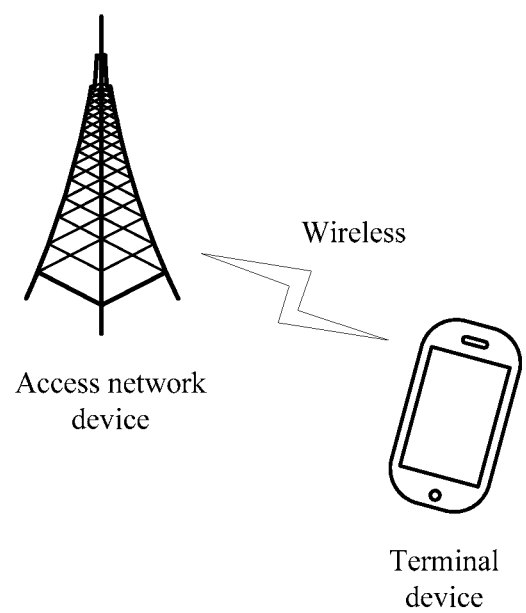
FIG. 2 is a schematic diagram of a communications system according to an embodiment of the present invention.

Referring to FIG. 2, FIG. 2 shows a communications system in the embodiments of the present invention. An access network device and a terminal device in the embodiments of the present invention may operate in an unlicensed spectrum. The access network device and the terminal device communicate with each other by using an air interface technology. The air interface technology may include: existing 2G (such as a Global System for Mobile Communications (GSM)), 3G (such as a Universal Mobile Telecommunications System (UMTS), Wideband Code Division Multiple Access (WCDMA), Time Division-Synchronous Code Division Multiple Access (TD-SCDMA)), 4G (such as FDD LTE and TDD LTE), and future 4.5 and 5G systems and the like.

The terminal device may further include a relay. Any device that can perform data communication with a base station may be considered as the terminal device. In descriptions of the present invention, the terminal device is general user equipment (UE). In addition, the terminal device may also be referred to as a mobile station, an access terminal, a subscriber unit, a subscriber station, a mobile console, a remote station, a remote terminal, a mobile device, a user terminal, a terminal, a wireless communications device, a user agent, a user apparatus, or the like. The terminal device may be a station (ST) in a wireless local area network (WLAN), a cellular phone, a cordless phone, a Session Initiation Protocol (. SIP) phone, a wireless local loop (WLL) station, a personal digital assistant (PDA), a handheld device having a wireless communication function, a computing device, another processing device connected to a wireless modem, an in-vehicle device, a wearable device, a mobile console in a future 5G network, a terminal device in a future evolved public land mobile network (PLMN), or the like.

The access network device may be a device configured to communicate with the terminal device. The access network device may be an access point (AP) in a WLAN, or a base transceiver station (BTS) in GSM or CDMA; or may be a NodeB (NB) in WCDMA; or may be an evolved NodeB (eNB) in LTE, a relay station or an access point, an in-vehicle device, a wearable device, an access network device in a future 5G network, an access network device in a future evolved PLMN network, or the like.

A cell mentioned in each of the following embodiments may be a cell corresponding to a base station, or the cell may be served by a macro base station or a base station corresponding to a small cell. The small cell may be a metro cell, a micro cell, a pico cell, a femto cell, or the like. These small cells are characterized by small coverage and low transmit power, and are applicable to providing high-rate data transmission services.

The present invention is applied to a wireless communications system, and in particular, to a licensed-assisted access LTE (LAA-LTE) system. The LAA-LTE system is an LTE system that uses a licensed frequency band together with an unlicensed spectrum in a carrier aggregation (CA) manner or a non-CA manner (such as dual connectivity (DC)). Details are as follows:

A mainstream deployment scenario is a scenario in which the licensed frequency band and the unlicensed spectrum are jointly used in the CA manner. To be specific, a carrier included in the licensed frequency band (which may also be referred to as a licensed frequency band) or a cell operating in the licensed frequency band serves as a primary cell. A carrier included in the unlicensed spectrum (which may also be referred to as an unlicensed spectrum) or a cell operating in the unlicensed spectrum serves as a secondary cell. The primary cell and the secondary cell may be deployed in a same base station or different base stations. An ideal backhaul path exists between the two cells.

However, the present invention is not limited to the foregoing CA scenario. Another deployment scenario further includes a scenario in which no ideal backhaul path exists between the two cells (the primary cell and the secondary cell). For example, a backhaul delay is relatively large, and consequently, information cannot be coordinated rapidly between the two cells. For example, the deployment scenario is a DC scenario.

In addition, a cell that is independently deployed and operates in the unlicensed spectrum, such as a standalone LTE over unlicensed spectrum (standalone U-LTE) system, may further be considered. To be specific, in this case, a serving cell operating in the unlicensed spectrum may directly provide an independent access function without assistance from the cell operating in the licensed frequency band.

In the embodiments of the present invention, it should be noted that a concept of a carrier in an LTE system is equivalent to a concept of a serving cell in the LTE system. For example, access of the terminal device to a carrier is equivalent to access of the terminal device to a serving cell. The concept of the serving cell is used in descriptions of all the embodiments of the present invention.

Figure 3:
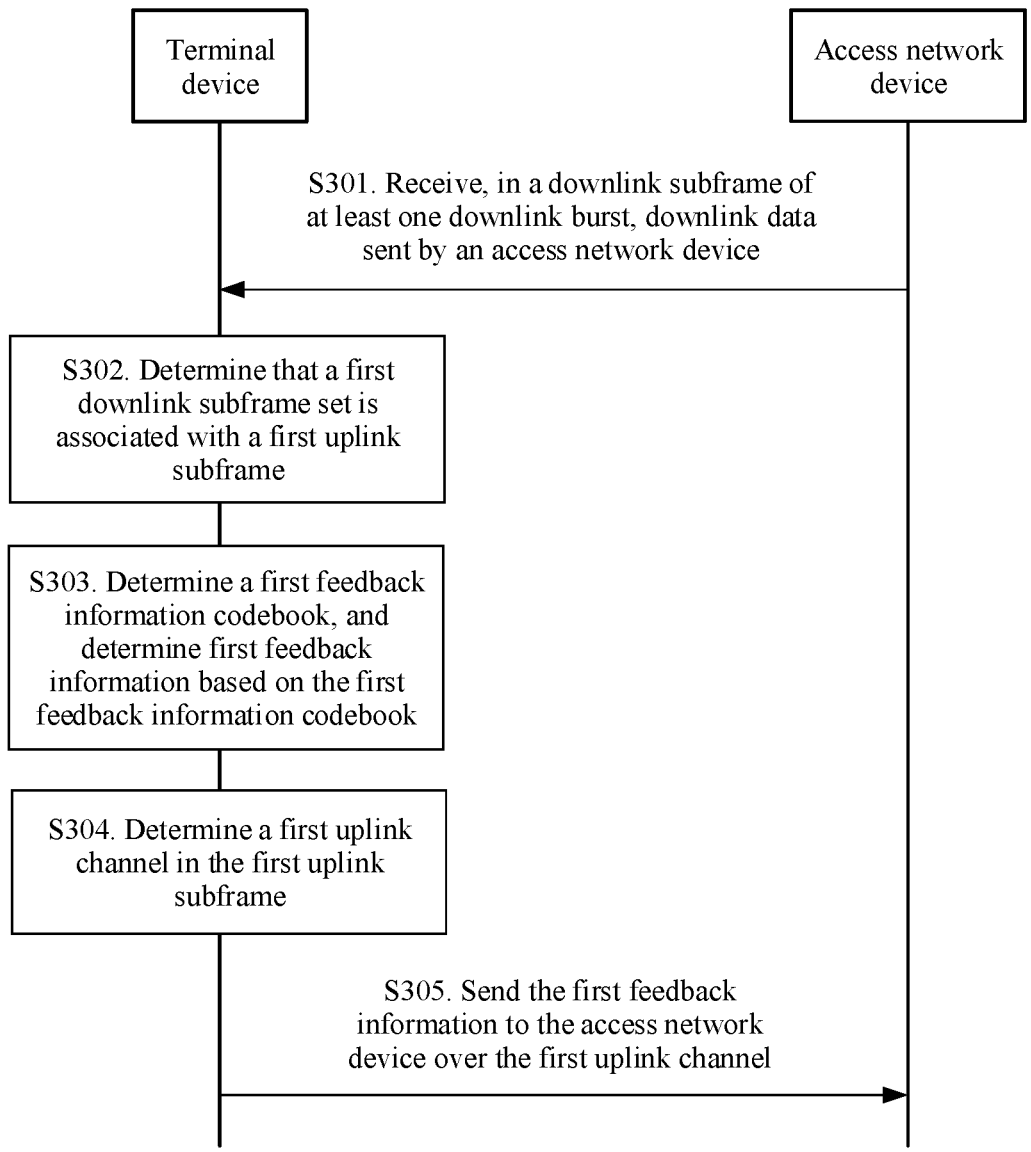
FIG. 3 is a schematic flowchart of a feedback information transmission method according to an embodiment of the present invention.

Referring to FIG. 3, FIG. 3 is a schematic flowchart of a feedback information transmission method according to an embodiment of the present invention. The method includes but is not limited to the following steps.

S301. A terminal device receives, in a downlink subframe of at least one downlink burst, downlink data sent by an access network device.

In this embodiment of the present invention, a downlink burst (DL Burst) is a plurality of downlink subframes that are consecutively occupied in terms of time. For example, after preempting an unlicensed spectrum resource, a base station (such as an eNB) or a cell served by the base station uses the unlicensed spectrum resource to perform data transmission without using a contention mechanism (such as LBT). A time length of one downlink burst is not greater than a maximum time period in which the base station (or the cell) can perform consecutive transmission on the unlicensed spectrum resource without using the contention mechanism. The maximum time period may be alternatively referred to as a maximum channel occupied time (MCOT). The MCOT may be related to a regional regulation constraint. For example, in Japan, the MCOT may be equal to 4 ms; in Europe, the MCOT may be equal to 8 ms, 10 ms, or 13 ms. The MCOT may also be related to a contention mechanism used by a listening device (such as a base station or user equipment). A shorter listening time period usually indicates a shorter MCOT. A length of the MCOT may further be related to a class of service of data transmission. In an example of an Internet phone service, a priority of the service is relatively high. In this case, the MCOT may be usually 2 ms. Therefore, after obtaining the unlicensed spectrum resource through contention, the base station may consecutively occupy 2 ms. In an example of a data transmission service, a priority of the service is relatively low. Usually, 8 ms or 10 ms may be consecutively occupied in this case.

Figure 4A:
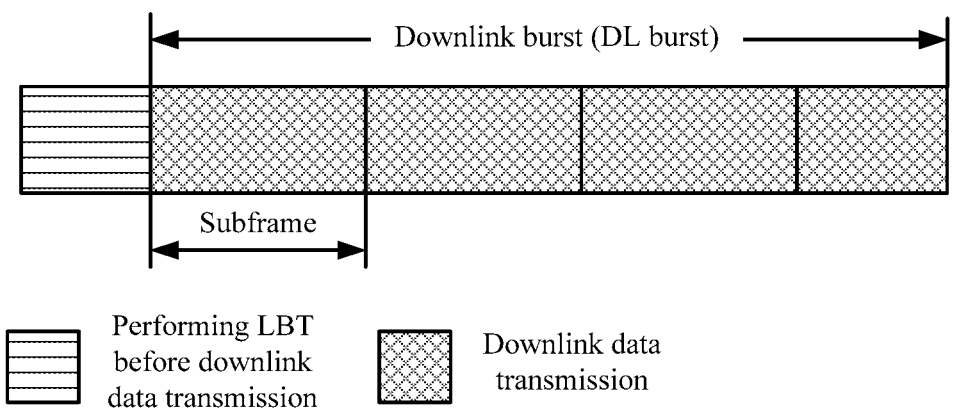
FIG. 4A is a schematic structural diagram of a downlink burst according to an embodiment of the present invention.

It should be noted that, in the foregoing description, that the contention mechanism does not need to be used may include: After preempting the unlicensed spectrum resource, in a time period in which data is actually sent on the unlicensed spectrum resource or in the MCOT, the base station or the cell does not need to use the contention mechanism to evaluate whether the unlicensed spectrum resource is available. For example, as shown in FIG. 4A, in a DL burst, starting from a second subframe, the base station does not need to use the contention mechanism to evaluate whether the unlicensed spectrum resource is available. In FIG. 4A, the DL burst may consecutively occupy four downlink subframes. A length of a time period used for downlink data transmission in a last downlink subframe is less than a time length of one downlink subframe.

Figure 4B:
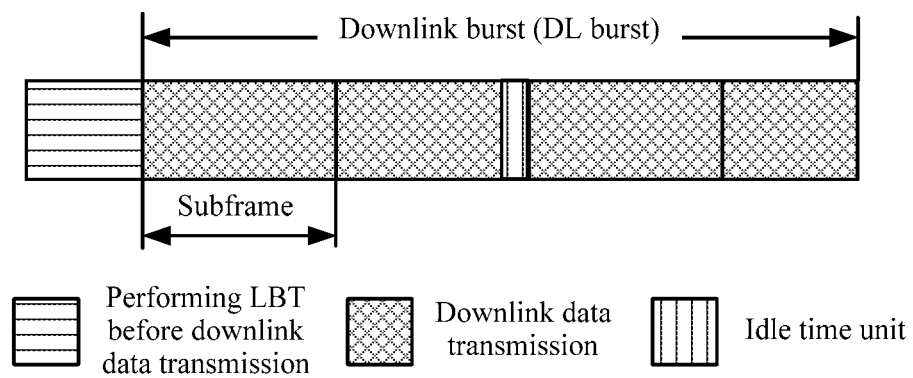
FIG. 4B is a schematic structural diagram of another downlink burst according to an embodiment of the present invention.

Alternatively, that the contention mechanism does not need to be used may further include: After preempting the unlicensed spectrum resource, in the time period in which data is actually sent on the unlicensed spectrum resource or in the MCOT, the base station or the cell may not need to use a contention mechanism under consideration of coexistence with a different system, but may use a contention mechanism under consideration of coexistence with a same system. Herein, the contention mechanism used for coexistence with a same system may include: After the unlicensed spectrum resource is preempted, a specific time unit (alternatively referred to as an idle time unit) may be included in the data sending time period or in the MCOT. In the specific time unit, the base station or the cell may stop data transmission (or may stop sending data). In the specific time unit, the base station or the cell may perform channel listening to re-evaluate whether the unlicensed spectrum resource is available, or may continue sending data in the data sending time period or in the MCOT without performing channel listening, as shown in FIG. 4B. In FIG. 4B, in a time range from a start of a DL burst to an end of the DL burst, the base station may stop sending of data at a random time point for a time period (corresponding to the idle time unit in FIG. 4B), so that another device in a same system may implement resource multiplexing with the base station on the unlicensed spectrum resource. Herein, for an LTE system, a non-LTE system may be considered as a different system, such as a WLAN system or a system using a Wi-Fi technology; an LTE system may be considered as a same system, and both an LTE system belonging to a same operator and an LTE system belonging to a different operator may be considered as same systems.

Figure 4C:
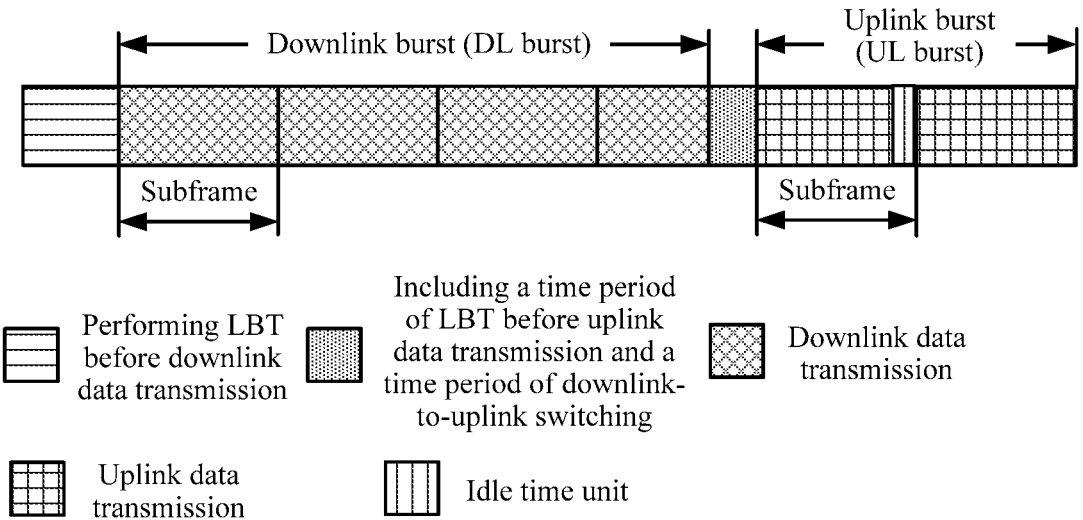
FIG. 4C is a schematic structural diagram of an uplink burst according to an embodiment of the present invention.
Figure 4D:
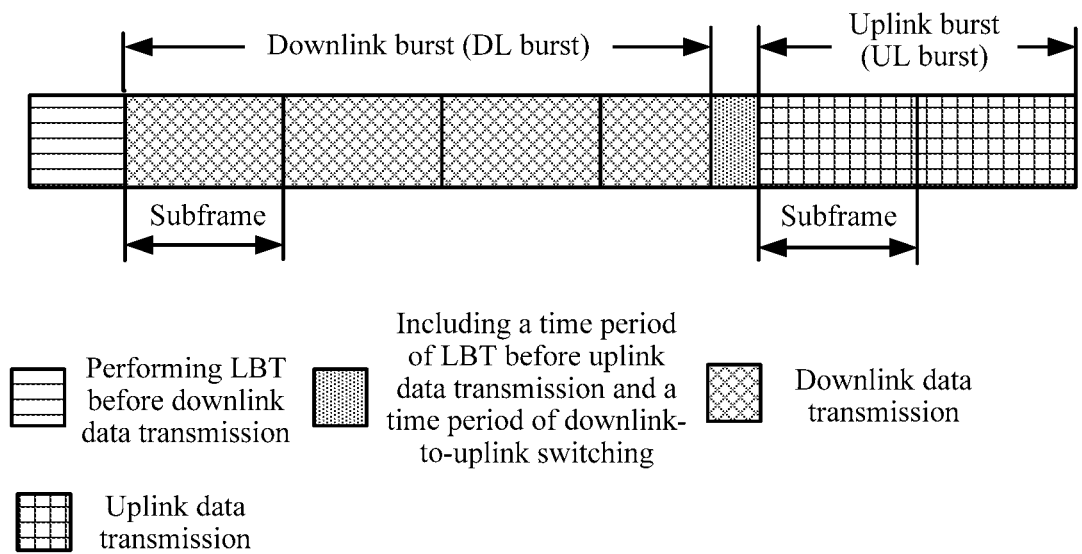
FIG. 4D is a schematic structural diagram of another uplink burst according to an embodiment of the present invention.

Correspondingly, in this embodiment of the present invention, an uplink burst (UL Burst) is a plurality of uplink subframes that are consecutively occupied in terms of time. Optionally, the plurality of uplink subframes may include a time zone (as shown by an idle time unit in FIG. 4C, where the idle time unit may be at least used by another terminal device to perform CCA) used by another terminal device to perform CCA, or may not include the time zone used by another terminal device to perform CCA (as shown in FIG. 4D).

Figure 4E:
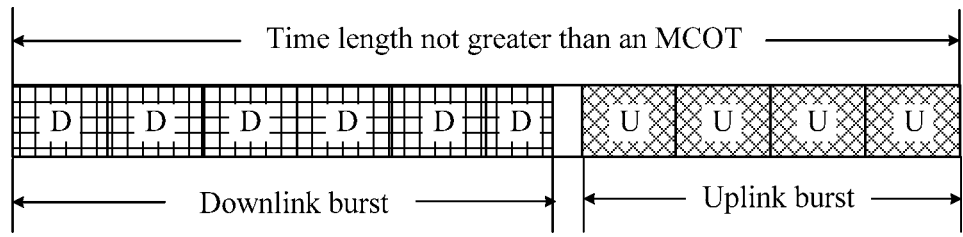
FIG. 4E is a schematic structural diagram of still another uplink burst according to an embodiment of the present invention.
Figure 4F:
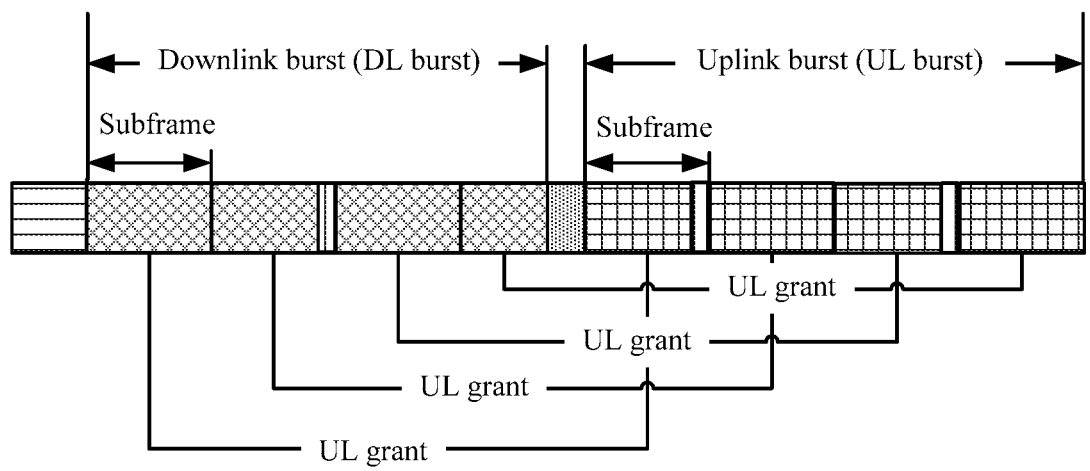
FIG. 4F is a schematic structural diagram of yet another uplink burst according to an embodiment of the present invention.
Figure 4F:
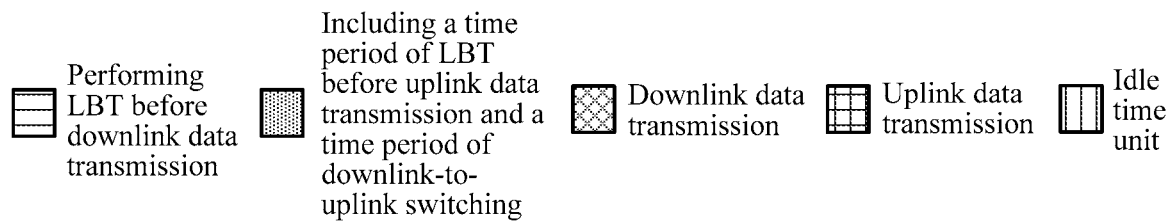

Optionally, the uplink burst may include: For example, after preempting an unlicensed spectrum resource, the terminal device uses the unlicensed spectrum resource to perform data transmission without using a contention mechanism (for example LBT). A time length of one uplink burst is not greater than an MCOT of the terminal device on the unlicensed spectrum resource. Another restriction on the time length of the uplink burst is not precluded herein. Alternatively, the uplink burst may include a plurality of uplink subframes that are consecutively occupied in terms of time and that are included between two adjacent downlink bursts. Alternatively, the uplink burst may include a plurality of uplink subframes that are consecutively occupied in terms of time and that are included in the MCOT of the base station after the base station obtains the unlicensed spectrum resource through contention, as shown in FIG. 4E. Alternatively, after the base station preempts the unlicensed spectrum resource, the terminal device performs data transmission from a first schedulable uplink subframe to a last schedulable uplink subframe based on a specific time delay (for example, based on a time delay of 4 ms) in a time range in which the base station uses the unlicensed spectrum resource to perform data transmission without using the contention mechanism or in a time period of one downlink burst, as shown in FIG. 4F. Correspondingly, a time range from a first uplink subframe to a last uplink subframe (which includes four subframes in FIG. 4F) is a time range corresponding to the UL burst.

With reference to the foregoing descriptions of the uplink burst and the downlink burst, in this embodiment of the present invention, that an uplink/downlink subframe configuration on an unlicensed spectrum may be flexible may be understood as follows: For example, one burst transmission in a U-LTE system may include N consecutive downlink subframes followed by one special subframe. A length of a time period used for downlink information transmission or downlink data transmission in the special subframe is less than a time length of one subframe. For example, if the time length of one subframe is 1 ms, the length of the time period used for downlink information transmission or downlink data transmission in the special subframe is less than 1 ms. Alternatively, there is only one guard period (GP) instead of the special subframe, followed by M uplink subframes. N and M are flexibly selected in each burst transmission by the base station. One burst transmission may be alternatively referred to as one transmission opportunity (TxOP).

In this embodiment of the present invention, the time length of a subframe is 1 ms. One subframe includes 14 orthogonal frequency division multiplexing (OFDM) symbols in a case with a normal cyclic prefix (NCP), and 12 OFDM symbols in a case with an extended cyclic prefix (ECP). Certainly, that an LTE system or another wireless system continuing to evolve in the future uses a shorter subframe is not precluded. For example, a time length of a future subframe is equal to a time length of one existing OFDM symbol. It should be noted that, in this embodiment of the present invention, a subframe whose time length is N OFDM symbols may express a same meaning as a transmission time interval (TTI) whose time length is N OFDM symbols. For the case with a normal cyclic prefix, N may be not greater than 14; for an extended cyclic prefix, N may be not greater than 12.

In this embodiment of the present invention, the downlink subframe is a subframe including data or information sent by the access network device to the terminal device. A length of a time period used for downlink data transmission or downlink information transmission in one downlink subframe may be equal to the time length of one downlink subframe, or may be less than the time length of one downlink subframe. The uplink subframe is a subframe including data or information sent by the terminal device to the access network device. A length of a time period used for uplink data transmission or uplink information transmission in one uplink subframe may be equal to a time length of one uplink subframe, or may be less than the time length of one uplink subframe.

Specifically, that a terminal device receives, in a downlink subframe of at least one downlink burst, downlink data sent by an access network device may specifically include the following steps.

Step 1: The terminal device detects a downlink control channel.

The terminal device may detect a downlink control channel in each downlink subframe of the at least one downlink burst, or may detect downlink control channels in some downlink subframes of the at least one downlink burst, or may detect a downlink control channel in each downlink subframe in a first downlink subframe set, or may detect downlink control channels in some downlink subframes in the first downlink subframe set. The first downlink subframe set belongs to the at least one downlink burst. The first downlink subframe set includes at least one downlink subframe of the at least one downlink burst. The downlink control channel herein may include at least a physical downlink control channel (PDCCH) or an enhanced physical downlink control channel (EPDCCH).

Step 2: The terminal device receives the downlink data on a downlink data channel scheduled by the detected downlink control channel, where the downlink data channel may be referred to as a PDSCH in an LTE system, and the downlink data channel carries the downlink data.

The downlink control channel and the downlink data channel scheduled by the downlink control channel are usually in a same downlink subframe. Certainly, that the two channels are in different downlink subframes is not precluded.

S302. The terminal device determines that a first downlink subframe set is associated with a first uplink subframe.

In this embodiment of the present invention, after receiving the downlink data on the downlink data channel, the terminal device needs to feed back an ACK or a NACK corresponding to the downlink data. This can ensure downlink data transmission efficiency. The first uplink subframe is used to send first feedback information corresponding to downlink data in the first downlink subframe set included in the at least one downlink burst. The first uplink subframe is in a first uplink burst. The first downlink subframe set includes one downlink subframe of the at least one downlink burst, or may include a plurality of downlink subframes of the at least one downlink burst. This is not specifically limited in this embodiment of the present invention. Downlink data in each downlink data channel is corresponding to one ACK or NACK. Certainly, that a plurality of pieces of downlink data carried in a plurality of downlink data channels are corresponding to one ACK or NACK is not precluded. The present invention is described by using an example in which the downlink data in each downlink data channel is corresponding to one ACK or NACK.

Figure 4G:
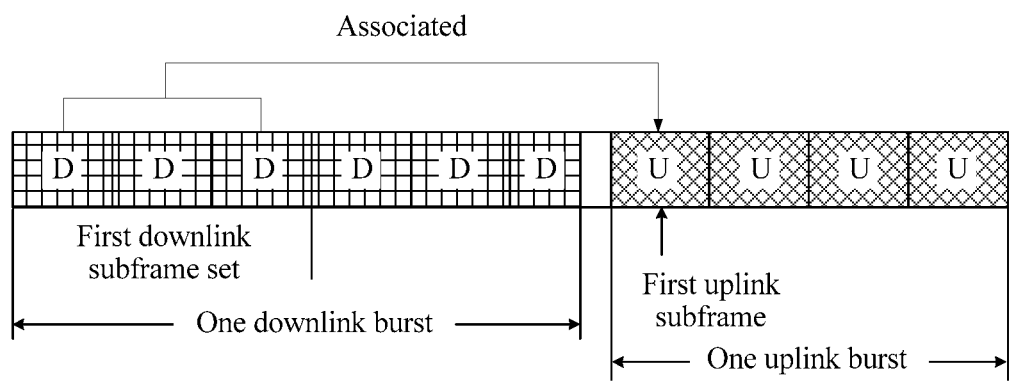
FIG. 4G is a schematic structural diagram of a first uplink burst according to an embodiment of the present invention.
Figure 4H:
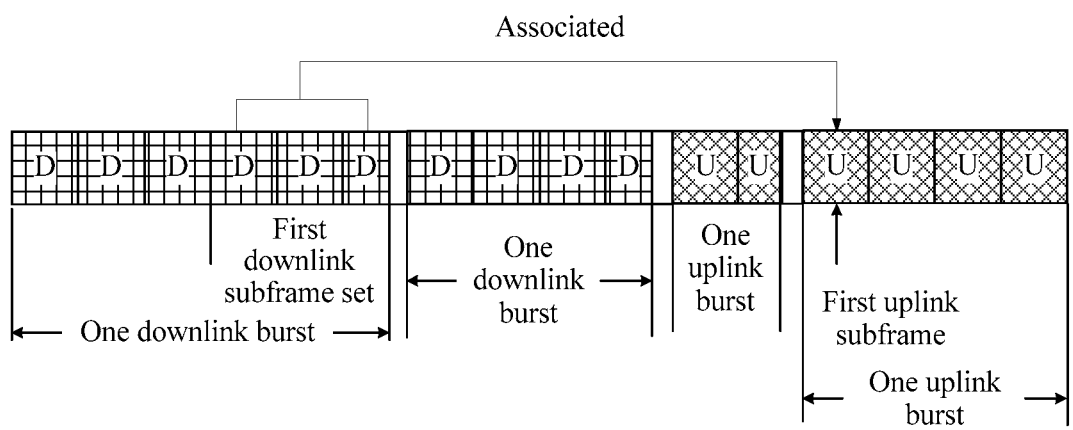
FIG. 4H is a schematic structural diagram of another first uplink burst according to an embodiment of the present invention.

Considering that the first uplink subframe is in the first uplink burst, and feedback information sent in the first uplink subframe is corresponding to the received downlink data in the first downlink subframe set, the first uplink burst definitely follows the at least one downlink burst. For example, as shown in FIG. 4G an uplink burst including the first uplink subframe may closely follow a downlink burst. When a quantity of downlink bursts is greater than one, the uplink burst including the first uplink subframe may closely follow a last downlink burst. For another example, another downlink burst and/or uplink burst may be alternatively included between the uplink burst including the first uplink subframe and the at least one downlink burst to which the first downlink subframe set belongs, as shown in FIG. 4H. These cases are not specifically limited in the present invention.

In this embodiment of the present invention, a meaning of association may be understood as follows: Feedback information corresponding to downlink data in some or all downlink subframes in the first downlink subframe set needs to be sent in the first uplink subframe. In this embodiment of the present invention, the meaning of association may be understood as follows: Feedback information corresponding to downlink data in all downlink subframes that are included in the first downlink subframe set needs to be sent in the first uplink subframe. An advantage of this practice is that no additional indication information is required for assisting the terminal device in determining specific downlink subframes included in the first downlink subframe set, where feedback information corresponding to downlink data in the specific downlink subframes needs to be fed back in the first uplink subframe. The meaning of association may be alternatively understood as follows: Feedback information corresponding to some or all downlink subframes in the first downlink subframe set needs to be sent in the first uplink subframe. Preferably, in this embodiment of the present invention, the meaning of association may be understood as follows: Feedback information corresponding to all downlink subframes in the first downlink subframe set needs to be sent in the first uplink subframe. With reference to FIG. 1B, a TDD uplink/downlink configuration 2 is used as an example. Downlink subframes associated with an uplink subframe 2 are downlink subframes 4, 5, 6, and 8 in N carriers configured for the terminal device. Therefore, the downlink subframes 4, 5, 6, and 8 are associated with the uplink subframe 2. Feedback information corresponding to downlink data in the downlink subframes 4, 5, 6, and 8 needs to be sent in the uplink subframe 2. For a single carrier, N is 1. For a plurality of carriers, for example, in a CA mode, N depends on a quantity of carriers configured for the terminal device. For example, N may be 5.

Herein, if a downlink subframe in the first downlink subframe set does not include downlink data of the terminal device, feedback information corresponding to the downlink subframe may be represented by a NACK or discontinuous transmission (DTX). Optionally, this association relationship may be preconfigured, for example, be determined based on a preset HARQ timing relationship. The HARQ timing relationship may be: An interval between a subframe in which downlink data is located and a subframe in which feedback information corresponding to the downlink data is sent is not less than a threshold. In an existing LTE system, the threshold is 4. To be specific, if UE receives downlink data in a subframe n, the UE may send feedback information of the downlink data in a subframe n+4 at the earliest. The threshold value may also have another value. Optionally, this association relationship may be alternatively determined by the access network device and then notified to the UE, for example, notified by using common signaling or UE-specific signaling. This is not specifically limited in this embodiment of the present invention.

For example, the terminal device may determine the first uplink subframe in a signaling indication manner or a preconfiguration manner, and then determine the first downlink subframe set based on the preset HARQ timing relationship. For another example, the terminal device may determine the first downlink subframe set in the signaling indication manner or the preconfiguration manner, and then determine the first uplink subframe based on the preset HARQ timing relationship. It should be noted that the preset HARQ timing relationship herein may be considered as an association form. More generally, in this step, the terminal device may determine the first downlink subframe set based on the determined first uplink subframe and the association relationship. Alternatively, the terminal device may determine the first uplink subframe based on the determined first downlink subframe set and the association relationship.

For example, the first uplink subframe is a first uplink subframe of the first uplink burst following the at least one downlink burst. For another example, if the terminal device receives uplink scheduling instruction information in a downlink subframe in the first downlink subframe set, a subframe in which uplink data corresponding to the uplink scheduling instruction information may also be the first uplink subframe. Further, if the terminal device receives uplink scheduling instruction information in a downlink subframe in the first downlink subframe set, and the uplink scheduling instruction information instructs the terminal device to transmit uplink data in at least two uplink subframes, a first one in the at least two uplink subframes may be the first uplink subframe. Certainly, that another uplink subframe in the at least two uplink subframes may also be the first uplink subframe is not precluded. For another example, if the terminal device receives scheduled downlink data in a plurality of downlink subframes of a downlink burst, an uplink subframe that is determined based on the HARQ timing relationship and that is corresponding to a downlink subframe in which a last piece of scheduled downlink data is located is the first uplink subframe. For another example, if the terminal device receives scheduled downlink data in a plurality of downlink subframes in the first downlink subframe set, an uplink subframe that is determined based on the HARQ timing relationship and that is corresponding to a downlink subframe in which a last piece of scheduled downlink data is located is the first uplink subframe. For another example, an uplink subframe that is determined based on the HARQ timing relationship and that is corresponding to a last downlink subframe included in the first downlink subframe set is the first uplink subframe. For another example, the terminal device may determine the first uplink subframe based on the HARQ timing relationship and a downlink subframe that carries downlink scheduling instruction information (for example, a DL grant) and that is included in a downlink burst or the first downlink subframe set. For another example, the terminal device may determine the first uplink subframe based on the HARQ timing relationship and a downlink subframe that carries uplink scheduling instruction information (for example, a UL grant) and that is included in a downlink burst or the first downlink subframe set. The DL grant and/or the UL grant herein may be carried in downlink control information (DCI). These cases are not specifically limited in the present invention.

For another example, the terminal device determines the first uplink subframe based on the uplink scheduling instruction information, and then determines, based on the HARQ timing relationship, the first downlink subframe set corresponding to the first uplink subframe. An optional manner is: If the terminal device receives UL grant information in the subframe n, the terminal device may determine that the subframe n+4 includes an uplink data channel scheduled by the UL grant information, and the terminal device may transmit uplink data on the uplink data channel. The terminal device may determine the subframe n+4 as the first uplink subframe, and then use, based on the HARQ timing relationship, all downlink subframes included in a downlink burst prior to the subframe n+4 as downlink subframes included in the first downlink subframe set, where a time delay between the subframe n+4 and the downlink burst is not less than 4 ms. Further, only downlink subframes that are in a downlink burst in which the subframe n is located and that meet the HARQ timing relationship with the uplink subframe n+4 may be used as the downlink subframes in the first downlink subframe set. Alternatively, in addition to that the downlink subframes that are in the downlink burst in which the subframe n is located and that meet the HARQ timing relationship with the uplink subframe n+4 may be used as the downlink subframes in the first downlink subframe set, a downlink subframe, in a downlink burst prior to the downlink burst in which the subframe n is located, in which downlink data for which no HARQ-ACK has been fed back is located may be alternatively used as a downlink subframe in the first downlink subframe set. In this embodiment of the present invention, the HARQ-ACK includes an ACK or a NACK. Optionally, when the first uplink subframe and/or the first downlink subframe set are/is determined in the signaling indication manner, the terminal device may receive the signaling in any one or more downlink subframes of any one or more downlink bursts in the at least one downlink burst. Alternatively, the terminal device may receive the signaling in a penultimate downlink subframe and/or a last downlink subframe of any one or more downlink bursts in the at least one downlink burst. Alternatively, the terminal device may receive the signaling in any one or more downlink subframes of a last downlink burst in the at least one downlink burst. Alternatively, the terminal device may receive the signaling in a penultimate downlink subframe and/or a last downlink subframe of a last downlink burst in the at least one downlink burst. Further, optionally, the signaling may be common control signaling. Optionally, the common control signaling may be used to indicate an end moment of a downlink burst. Preferably, the common control signaling may indicate an end moment of a downlink burst including the common control signaling.

It should be noted that the signaling indication manner or the preconfiguration manner may also be used by the terminal device to determine a second uplink subframe and/or a second downlink subframe set below, or may be used by the terminal device to determine a third uplink subframe and/or a third downlink subframe set below.

S303. The terminal device determines a first feedback information codebook, and determines first feedback information based on the first feedback information codebook.

Specifically, the first feedback information may be represented by an ACK or a NACK, or may be represented by DTX.

In this embodiment of the present invention, the first feedback information corresponding to the downlink data in the first downlink subframe set may include feedback information corresponding to all downlink subframes in the first downlink subframe set. For the terminal device, if only some downlink subframes in the first downlink subframe set include downlink data scheduled for the terminal device, for example, a PDSCH is scheduled by using an (E)PDCCH, feedback information corresponding to an unscheduled downlink subframe may be represented by a NACK; feedback information corresponding to a downlink subframe that includes the downlink data scheduled for the terminal device and that is in the first downlink subframe set may be represented by an ACK or a NACK. Alternatively, for the terminal device, the first feedback information corresponding to the downlink data in the first downlink subframe set may include first feedback information corresponding to all scheduled downlink subframes in the first downlink subframe set.

A codebook multiplexing mode included in sending modes of a physical uplink control channel (PUCCH) in a single carrier or CA mode is used as an example to describe a meaning of the first feedback information codebook in this embodiment of the present invention. There is a plurality of sending modes of the PUCCH in the single carrier or CA mode, such as a binding mode, a channel selection mode, and the codebook multiplexing mode. The codebook multiplexing mode is relatively commonly used. The TDD uplink/downlink configuration 2 that is a mainstream deployment in an existing network is used as an example to illustrate the codebook multiplexing mode. Referring to FIG. 1B, an uplink subframe 2 of one carrier may support feedback of four ACK or NACK bits (herein, it is assumed that downlink data scheduled by a downlink subframe associated with the uplink subframe 2 is corresponding to one transmission block (TB) or is corresponding to transmission of one downlink code word). CA of five carriers with the TDD uplink/downlink configuration 2 may support feedback of 20 ACK or NACK bits. In this case, it may be considered that a downlink subframe set associated with the uplink subframe 2 is downlink subframes 4, 5, 6, and 8 in the five carriers configured for the UE. In the codebook multiplexing mode, generation of a codebook for an ACK or a NACK that needs to be fed back in the uplink subframe 2 is determined based on the downlink subframe set associated with the uplink subframe 2. The codebook for the ACK or the NACK is a bit stream in which original bits of the ACK or the NACK before coding are arranged in a specific order. Herein, the bit stream in which the original bits of the ACK or the NACK are arranged in the specific order may be considered as the feedback information codebook in this embodiment of the present invention. In this example, a size of the codebook corresponding to the feedback information ACK or NACK is 20 bits. A specific order may be an order of subframes followed by carriers. To be specific, ACK or NACK bits corresponding to subframes 4, 5, 6, and 8 of a carrier 1 are arranged first, and then ACK or NACK bits corresponding to subframes 4, 5, 6, and 8 of a carrier 2 are arranged. ACK or NACK bits corresponding to subframes of remaining carriers continue to be arranged in the foregoing manner. Particularly, NACK information needs to be filled in for an unscheduled downlink subframe or for an ACK or NACK bit location corresponding to a downlink subframe in which the UE does not receive downlink data.

Further, the terminal device may determine the first feedback information after determining the first feedback information codebook. For example, after the terminal device determines the feedback information codebook, the terminal device needs to perform channel coding based on the codebook. A channel coding type may be linear block coding, convolutional code, turbo code, or the like. The channel coding type is not limited in the present invention. If the linear block coding such as Reed-Muller code is used, a cyclic redundancy check (CRC) usually does not need to be added before coding. If the convolutional code or turbo code is used, the terminal device may add a CRC bit for the feedback information codebook before coding. That the terminal device determines the first feedback information based on the first feedback information codebook may further include data modulation and data mapping in addition to channel coding.

S304. The terminal device determines a first uplink channel in the first uplink subframe.

In this embodiment of the present invention, the first uplink channel may be a PUCCH, or may be a physical uplink shared channel (PUSCH). Before the terminal device sends the first feedback information, the method further includes: determining a resource that is in the first uplink subframe and that is used to send the first feedback information. For example, the terminal device receives higher layer signaling sent by the access network device such as Radio Resource Control (RRC) signaling, and obtains, from the RRC signaling, a PUCCH resource set configured by the access network device for the terminal device. The PUCCH resource set includes at least one PUCCH resource. PUCCHs in the PUCCH resource set may have a same format or may include at least two PUCCH formats. Then, after obtaining the resource set, the terminal device may receive resource indication information sent by the access network device. Finally, a physical resource used to carry the feedback information is determined from the PUCCH resource set based on the resource indication information. It should be noted that the foregoing is only one resource indication manner, and another specific manner is not limited.

It should be noted that a performing sequence of step S303 and step S304 is not limited. The terminal device may obtain the first feedback information before determining the first uplink channel, or may determine the first uplink channel before obtaining the first feedback information.

S305. The terminal device sends the first feedback information to the access network device on the first uplink channel.

In an optional implementation, the method further includes:

The terminal device determines that a second downlink subframe set is associated with a second uplink subframe, where the second downlink subframe set belongs to the at least one downlink burst, the first downlink subframe set is a subset of the second downlink subframe set, the second uplink subframe is used to send second feedback information corresponding to downlink data in the second downlink subframe set, the second uplink subframe is in the first uplink burst, and the second uplink subframe follows the first uplink subframe;

the terminal device determines a second feedback information codebook, and determines the second feedback information based on the second feedback information codebook;

the terminal device determines a second uplink channel in the second uplink subframe; and the terminal device sends the second feedback information to the access network device on the second uplink channel.

Optionally, the terminal device may determine the second downlink subframe set, the second uplink subframe, and an association relationship by using the same method as described above or in another manner. This is not specifically limited herein.

In this embodiment of the present invention, optionally, a relationship between the first downlink subframe set and the second downlink subframe set and a relationship between the first uplink subframe and the second uplink subframe may be shown in FIG. 4I to FIG. 4L.

Figure 4I:
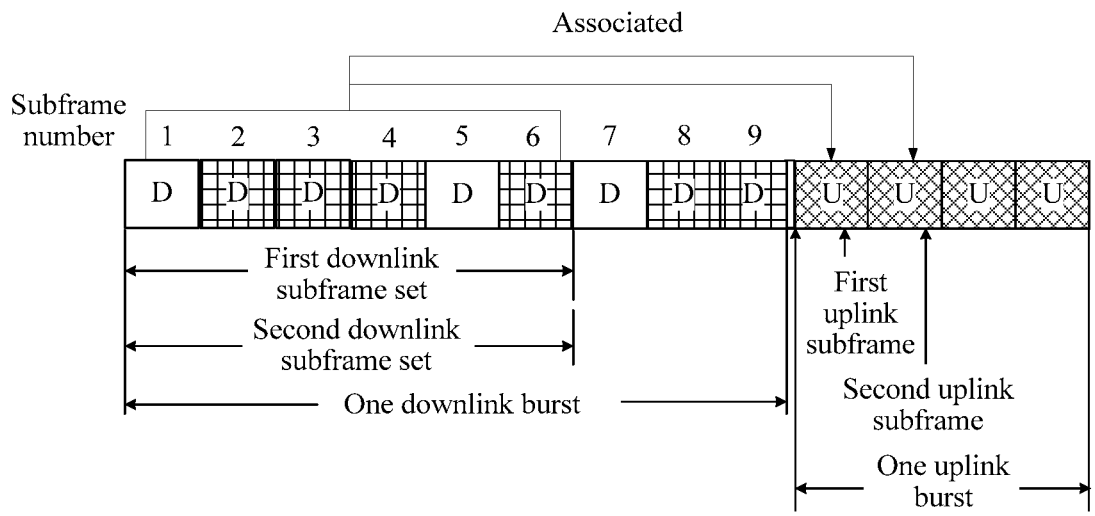
FIG. 4I is a schematic diagram of a relationship between a first downlink subframe set and a second downlink subframe set according to an embodiment of the present invention.
Figure 4J:
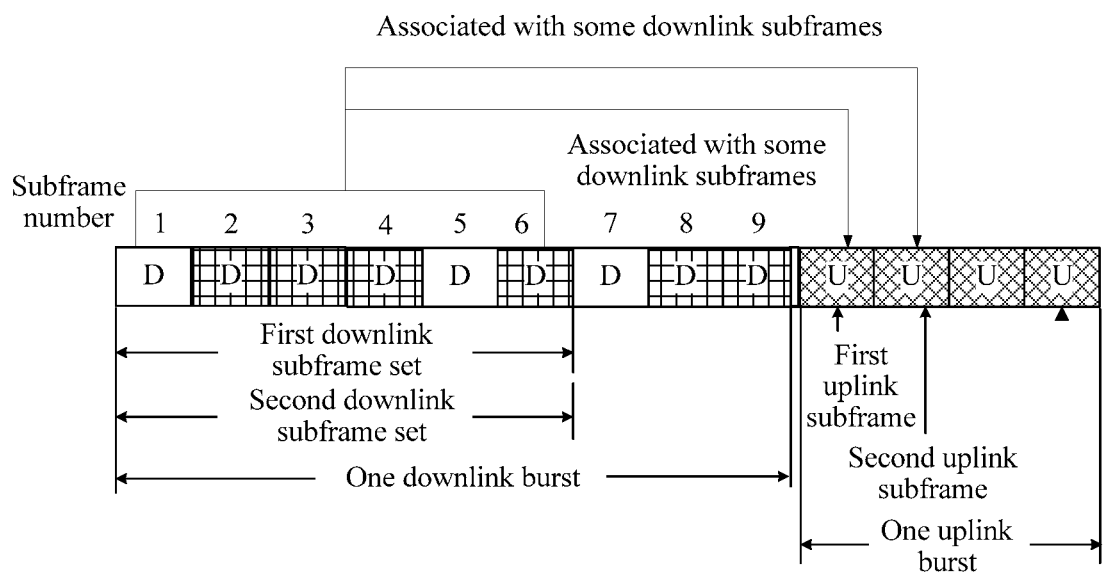
FIG. 4J is a schematic diagram of another relationship between a first downlink subframe set and a second downlink subframe set according to an embodiment of the present invention.
Figure 4K:
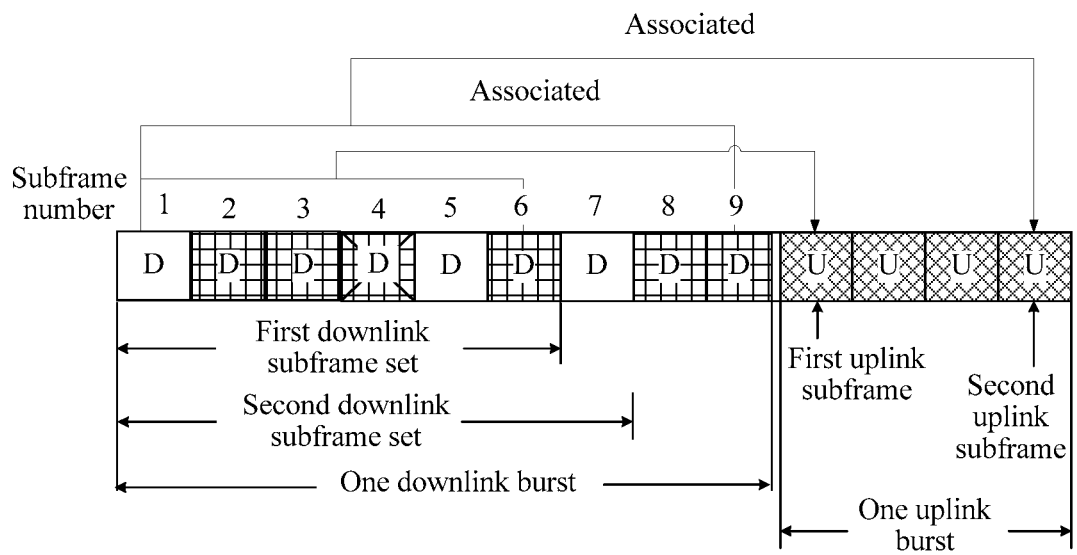
FIG. 4K is a schematic diagram of still another relationship between a first downlink subframe set and a second downlink subframe set according to an embodiment of the present invention.
Figure 4L:
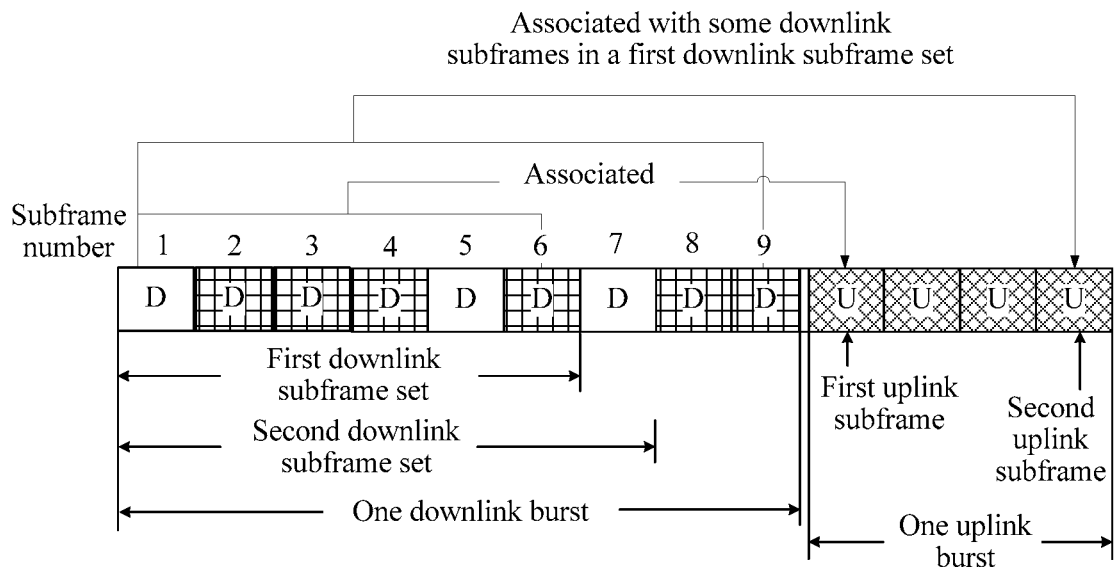
FIG. 4L is a schematic diagram of yet another relationship between a first downlink subframe set and a second downlink subframe set according to an embodiment of the present invention.

In this embodiment of the present invention, a subset includes a universal set or a proper subset. Specifically, as shown in FIG. 4I and FIG. 4J, the first downlink subframe set is the same as the second downlink subframe set. In other words, the subset is equivalent to a universal set. Alternatively, as shown in FIG. 4K and FIG. 4L, the first downlink subframe set is a proper subset of the second downlink subframe set.

In FIG. 4I, the first downlink subframe set is the same as the second downlink subframe set. The second uplink subframe may be any uplink subframe that is in a same uplink burst as the first uplink subframe and that follows the first uplink subframe. This is equivalent to that a plurality of uplink subframes may be associated with the first downlink subframe set. An advantage of this practice is that even if the terminal device does not obtain, in the first uplink subframe through contention, an opportunity of using an unlicensed channel, the terminal device may continue to determine, in the second uplink subframe, whether an unlicensed spectrum resource can be obtained through contention. If an unlicensed spectrum resource can be obtained through contention, the terminal device may continue to feed back feedback information associated with the first downlink subframe set. Compared with the prior art in which feedback information associated with scheduled downlink data is fed back in only one uplink subframe, this embodiment of the present invention can enhance a feedback information transmission opportunity, thereby improving a probability of successful feedback information transmission, and is particularly applicable to a contention-based system operating in an unlicensed spectrum.

In addition, according to this embodiment of the present invention, even if the terminal device obtains, in the first uplink subframe through contention, the opportunity of using the unlicensed channel to ensure transmission of the feedback information associated with the first downlink subframe set, the terminal device may also add the first feedback information to the second feedback information that is to be sent in the second uplink subframe. An advantage of this practice is that, compared with the following technology A, this embodiment of the present invention can ensure that the access network device and the terminal device have a consistent understanding of feedback information transmitted in another uplink subframe following the first uplink subframe. The technology A is described as follows: A terminal device determines that at least two uplink subframes are used to transmit feedback information for downlink data. It is assumed that a first uplink subframe in the at least two uplink subframes is used to transmit feedback information corresponding to downlink subframes whose downlink subframe numbers are 1/2/3. Another uplink subframe in the at least two uplink subframes is used to transmit feedback information corresponding to a downlink subframe whose downlink subframe number is 4. If the terminal device does not obtain an unlicensed spectrum resource through contention in the first uplink subframe, the terminal device cannot transmit, in the first uplink subframe, the feedback information corresponding to the downlink subframes whose downlink subframe numbers are 1/2/3. In this case, an approach in the technology A is as follows: If the terminal device obtains an unlicensed spectrum resource through contention in another uplink subframe, the terminal device transmits, in the another uplink subframe, feedback information corresponding to downlink subframes whose downlink subframe numbers are 1/2/3/4. In addition, if the terminal device obtains an unlicensed spectrum resource through contention in the first uplink subframe, the terminal device still transmits, in the first uplink subframe, the feedback information corresponding to the downlink subframes whose downlink subframe numbers are 1/2/3, and transmits, in the another uplink subframe, only the feedback information corresponding to the downlink subframe whose downlink subframe number is 4. It may be observed that a core of the technology A is that feedback information transmitted in an uplink subframe other than the first uplink subframe in the determined at least two uplink subframes is relevant to whether an unlicensed spectrum resource is obtained through contention in the first uplink subframe. In this case, the access network device needs to first determine whether the terminal device obtains an unlicensed spectrum resource through contention in the first uplink subframe, and then determine downlink subframes whose data is corresponding to feedback information transmitted by the terminal device in the another uplink subframe. A method is that the access network device may determine, through discontinuous transmission (DTX) detection, whether the terminal device obtains an unlicensed spectrum resource through contention in the first uplink subframe. For example, the access network device may detect whether the first uplink subframe includes an uplink demodulation reference signal (DMRS) to determine whether the terminal device obtains an unlicensed spectrum resource through contention in the first uplink subframe. However, considering interference caused by a hidden node that may exist in the unlicensed spectrum, detection performance is unreliable when the access network device detects whether there is a DMRS to determine whether the terminal device obtains an unlicensed spectrum resource through contention in the first uplink subframe. For example, the terminal device obtains an unlicensed spectrum resource through contention in the first uplink subframe, and transmits the feedback information corresponding to the downlink subframes whose downlink subframe numbers are 1/2/3; and transmits, in another uplink subframe following the first uplink subframe, only the feedback information corresponding to the downlink subframe whose subframe number is 4. However, because of the interference caused by the hidden node, the access network device does not detect a DMRS included in the first uplink subframe. Therefore, the access network device incorrectly considers that the terminal device may feed back, in the another uplink subframe following the first uplink subframe, the feedback information corresponding to the downlink subframes whose downlink subframe numbers are 1/2/3/4. Consequently, the access network device and the terminal device incorrectly determine feedback information carried in the another uplink subframe following the first uplink subframe. This further leads to a data demodulation failure. It should be noted that a cause for the unreliable detection performance of the network access device may alternatively include a factor other than the hidden node is not precluded herein. That the access network device may alternatively determine, in another detection manner other than blind detection of a DMRS, whether the terminal device obtains an unlicensed spectrum resource through contention in the first uplink subframe is also not precluded. According to the method in this embodiment of the present invention, the feedback information transmitted in the second uplink subframe (which may be understood as "the another uplink subframe in the prior technology A") includes the feedback information that needs to be transmitted in the first uplink subframe (which may be understood as "the first uplink subframe in the prior technology A"), regardless of whether the terminal device obtains an unlicensed spectrum resource through contention in the first uplink subframe. This can ensure that the access network device and the terminal device have a consistent understanding of the feedback information transmitted in the second uplink subframe, and ensure reliable feedback information transmission.

A difference between FIG. 4J and FIG. 4I lies in that, for the terminal device, only feedback information associated with some downlink subframes in the first downlink subframe set is fed back in the first uplink subframe. For example, the downlink subframes may include downlink subframes of a PDSCH scheduled for the terminal device. Similarly, only feedback information associated with some downlink subframes in the second downlink subframe set may be fed back in the second uplink subframe. For example, in FIG. 4J, the feedback information included in the first uplink subframe may be corresponding to downlink subframes whose subframe numbers are 2/3/4/6. In FIG. 4I, the feedback information included in the first uplink subframe may be corresponding to downlink subframes whose subframe numbers are 1/2/3/4/5/6.

In FIG. 4K, the first downlink subframe set is a proper subset of the second downlink subframe set. The second uplink subframe may be any uplink subframe that is in a same uplink burst as the first uplink subframe and that follows the first uplink subframe.

A difference between FIG. 4L and FIG. 4K lies in that only feedback information associated with some downlink subframes in the first downlink subframe set is fed back in the first uplink subframe. Similarly, only feedback information associated with some downlink subframes in the second downlink subframe set may be fed back in the second uplink subframe.

It should be noted that, in this embodiment of the present invention, whether the first uplink subframe is associated with some or all downlink subframes in the first downlink subframe set and whether the second uplink subframe is associated with some or all downlink subframes in the second downlink subframe set may be configured separately or consistently. Preferably, the first uplink subframe is associated with all downlink subframes in the first downlink subframe set. To be specific, the first uplink subframe may include HARQ-ACKs corresponding to all downlink subframes in the first downlink subframe set, regardless of whether all downlink subframes included in the first downlink subframe set include a PDSCH scheduled for the terminal device. Preferably, the second uplink subframe is associated with all downlink subframes in the second downlink subframe set. To be specific, the second uplink subframe may include HARQ-ACKs corresponding to all downlink subframes in the second downlink subframe set, regardless of whether all downlink subframes included in the second downlink subframe set include a PDSCH scheduled for the terminal device.

Optionally, in this embodiment of the present invention, the second uplink subframe is a last uplink subframe in the uplink burst in which the first uplink subframe is located. An advantage of this practice is that more transmission opportunities can be provided for sending the second feedback information. For example, even if the terminal device does not obtain an unlicensed spectrum resource through contention from a first uplink subframe to a penultimate uplink subframe in the uplink burst including the first uplink subframe, the terminal device can still determine, before a last uplink subframe in the uplink burst, whether an unlicensed spectrum resource is available.

Figure 4M:
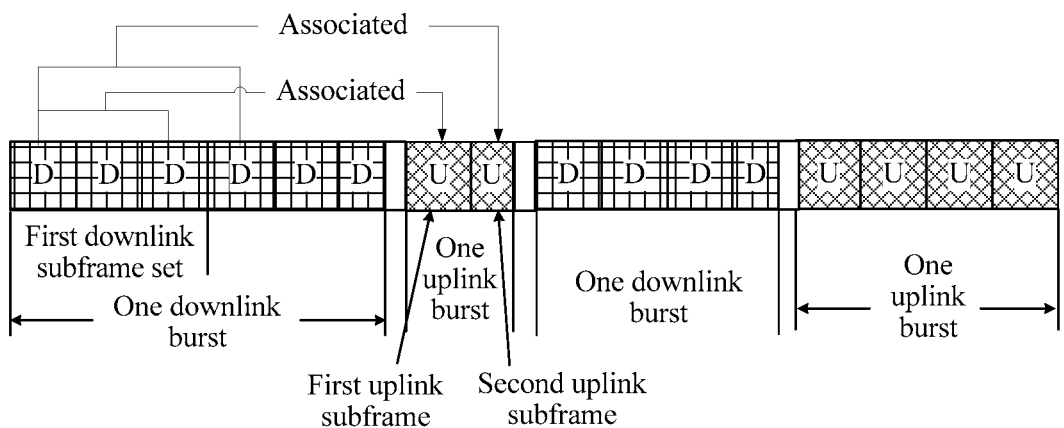
FIG. 4M is a schematic diagram of a location relationship between a first uplink subframe and a second uplink subframe according to an embodiment of the present invention.

Alternatively, optionally, in this embodiment of the present invention, the second uplink subframe is the penultimate uplink subframe in the uplink burst in which the first uplink subframe is located. An advantage of this practice is that more transmission opportunities can be provided for sending the second feedback information, and in addition, transmission of the second feedback information can be ensured. This is because, in some cases, a downlink burst may closely follow the uplink burst in which the first uplink subframe is located, as shown in FIG. 4M. In this case, a length of a time period used for uplink data or information transmission in the last uplink subframe included in the uplink burst in which the first uplink subframe is located may be less than a length of one uplink subframe. In this way, a listening location can be reserved for the subsequent downlink burst. In this case, to ensure the transmission of the second feedback information, the second uplink subframe may be the penultimate uplink subframe in the uplink burst in which the first uplink subframe is located.

Alternatively, optionally, in this embodiment of the present invention, the second uplink subframe is an uplink subframe, other than the first uplink subframe, in which a length of a time period used for uplink data or information transmission is not less than a specific threshold. For example, considering lossless HARQ-ACK transmission, if a length of a time period used for uplink information transmission in an uplink subframe needs to be 14 OFDM symbols, in this example, the specific threshold may be set to 14 OFDM symbols. In other words, the length of the time period used for uplink information transmission in the second uplink subframe is not less than 14 OFDM symbols.

For a normal cyclic prefix configuration, the length of the time period used for uplink information transmission in the second uplink subframe is equal to the time length of one subframe.

Optionally, in this embodiment of the present invention, the second uplink subframe and the first uplink subframe are in the same uplink burst, that is, in the first uplink burst, as shown in FIG. 4M. An advantage of this practice is as follows: One downlink burst may exist between different uplink bursts, as shown in FIG. 4M. In this case, if the second uplink subframe and the first uplink subframe are in the same uplink burst, the access network device may obtain, in a second downlink burst, a HARQ-ACK fed back by the terminal device for scheduled downlink data in a first downlink burst. Then the access network device may determine, based on the HARQ-ACK fed back by the terminal device, whether data that fails to be scheduled needs to be retransmitted or new data transmission needs to be started in the second downlink burst, and may further determine to transmit new data for successfully scheduled data in the second downlink burst. This can reduce a data processing delay.

It should be noted that the second uplink subframe may alternatively follow the first uplink subframe and be in an uplink burst following the first uplink burst, instead of being in the first uplink burst. Further, optionally, the second uplink subframe may be a last, a first, or a penultimate uplink subframe in the uplink burst following the first uplink burst, or may be an uplink subframe in which the length of the time period used for uplink data or information transmission is not less than the specific threshold. However, this manner is not better than the manner in which "the second uplink subframe is in the first uplink burst". This is because if the second uplink subframe and the first uplink subframe are not in the same uplink burst, and no unlicensed spectrum resource is obtained through contention in the first uplink subframe, the access network device needs to obtain, only in the second downlink burst and after the second uplink subframe, the HARQ-ACK corresponding to the scheduled downlink data in the first downlink burst. This is equivalent to increasing a data transmission delay of the access network device.

Figure 4N:
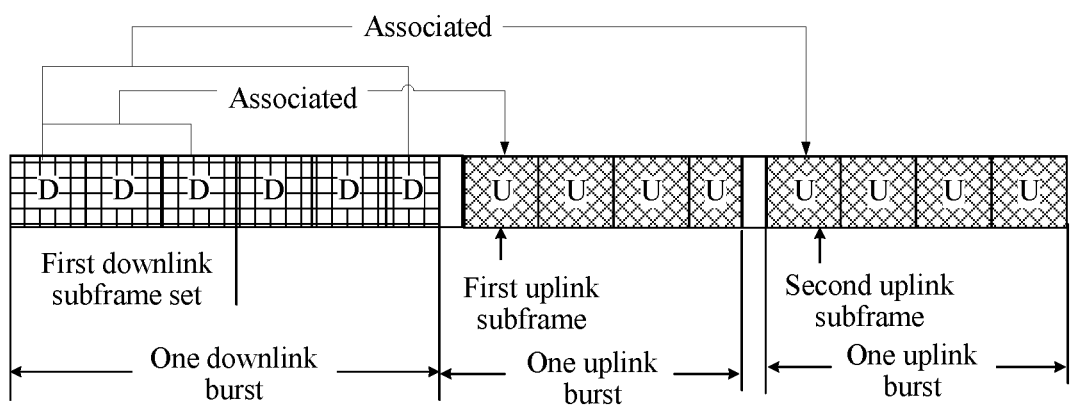
FIG. 4N is a schematic diagram of another location relationship between a first uplink subframe and a second uplink subframe according to an embodiment of the present invention.

Optionally, the second uplink subframe may be in a second uplink burst. The second uplink burst follows the first uplink burst, and the second uplink burst is adjacent to the first uplink burst. In other words, another downlink burst is not included between the first uplink burst and the second uplink burst, as shown in FIG. 4N. It should be noted herein that, in principle, a burst including uplink subframes that are consecutively transmitted in terms of time may be considered as one uplink burst; however, considering maximum use duration such as the MCOT in the unlicensed spectrum, that the consecutively transmitted uplink subframes are divided into a plurality of uplink bursts is not precluded. Further, optionally, the second uplink subframe may be a last, a first, or a penultimate uplink subframe in the second uplink burst, or may be an uplink subframe in which the length of the time period used for uplink data or information transmission is not less than the specific threshold. This is not specifically limited in the present invention.

In an optional implementation, before the terminal device sends the second feedback information to the access network device on the second uplink channel, the method further includes:

The terminal device receives overlapping codebook indication information sent by the access network device; and the terminal device determines, based on the overlapping codebook indication information, the second downlink subframe set associated with the second uplink subframe.

In this embodiment of the present invention, that the terminal device determines, based on the overlapping codebook indication information, the second downlink subframe set associated with the second uplink subframe may include: The terminal device may determine, based on the overlapping codebook indication information, whether the second feedback information fed back in the second uplink subframe includes the first feedback information; or the terminal device may determine, based on the overlapping codebook indication information, that the second uplink subframe is associated with feedback information corresponding to which downlink subframes in the second downlink subframe set; or the terminal device may determine, based on the overlapping codebook indication information, that the second uplink subframe is associated with which downlink subframes in the second downlink subframe set. The subframes herein may include some or all subframes in the first downlink subframe set, or may include no subframe in the first downlink subframe set.

Optionally, the overlapping codebook indication information is used to indicate whether the second feedback information fed back in the second uplink subframe includes the feedback information corresponding to the downlink data in the first downlink subframe set. The overlapping codebook indication information may be alternatively used to indicate that the second feedback information fed back in the second uplink subframe specifically includes feedback information corresponding to which downlink subframes in the first downlink subframe set. Optionally, the second feedback information may include all content of the first feedback information. Alternatively, the second feedback information may include some content of the first feedback information.

Optionally, the overlapping codebook indication information may be carried in uplink scheduling instruction information that schedules the second uplink subframe, such as a UL grant. For example, the UL grant includes indication information of one bit. When the bit is set to 1 or 0, it indicates that the second feedback information fed back in the second uplink subframe needs to include the first feedback information. In other words, the second downlink subframe set associated with the second uplink subframe includes all downlink subframes or some downlink subframes in the first downlink subframe set. Further, when some downlink subframes are included, the preconfiguration manner or another signaling indication manner may be used to allow the terminal device to determine some downlink subframes in the first downlink subframe set that are associated with the second uplink subframe. In this embodiment of the present invention, when the terminal device determines, based on the overlapping codebook indication information, that the second feedback information transmitted in the second uplink subframe includes the first feedback information, the second feedback information includes all content of the first feedback information. In other words, the second feedback information is corresponding to feedback information corresponding to all downlink subframes included in the second downlink subframe set.

Alternatively, in this embodiment of the present invention, the overlapping codebook indication information may be implicitly indicated instead of being sent by the access network device. For example, if the terminal device needs to determine, through CCA before the first uplink subframe, whether the first feedback information can be sent in the first uplink subframe, the terminal device may determine that the second feedback information associated with the second uplink subframe needs to include all content of the first feedback information. Alternatively, for another example, if the terminal device needs to determine, through CCA, whether an unlicensed spectrum resource is available before determining to transmit the first feedback information in the first uplink subframe, the terminal device may determine that the second feedback information in the second uplink subframe needs to include the feedback information corresponding to the downlink data in the first downlink subframe set.

Further, optionally, that the terminal device determines, based on the overlapping codebook indication information, the second downlink subframe set associated with the second uplink subframe may further include: The terminal device determines, based on the overlapping codebook indication information, that the second downlink subframe set includes all downlink subframes that are in a downlink burst in which a downlink subframe of the overlapping codebook indication information is located and that meet a HARQ timing relationship with the second uplink subframe. The HARQ timing relationship herein may be understood as follows: If the second uplink subframe is denoted by a subframe n, and a subframe that is in the downlink burst and that meets the HARQ timing relationship with the second uplink subframe is denoted by a subframe m, a result of n−m is not less than 4. That a shorter HARQ timing relationship is defined in a future LTE system is not precluded herein. For example, the result of n−m may be alternatively not less than N, where N is a natural number less than 4. Alternatively, that the terminal device determines, based on the overlapping codebook indication information, that the second uplink subframe is associated with the second downlink subframe set may further include: The terminal device determines, based on the overlapping codebook indication information, that the second downlink subframe set includes all downlink subframes that are in the downlink burst in which the downlink subframe of the overlapping codebook indication information is located and that meet the HARQ timing relationship with the second uplink subframe, and all downlink subframes for which no HARQ-ACK is fed back in a downlink burst prior to the downlink burst in which the downlink subframe of the overlapping codebook indication information is located. A reason why no HARQ-ACK is fed back may be that the terminal device does not obtain an unlicensed spectrum resource through contention. Alternatively, that the terminal device determines, based on the overlapping codebook indication information, that the second uplink subframe is associated with the second downlink subframe set may further include: If an uplink burst in which the second uplink subframe is located is the first uplink burst, the terminal device determines, based on the overlapping codebook indication information, that all downlink subframes associated with uplink subframes in the first uplink burst except the first uplink subframe in the first uplink burst are downlink subframes included in the second downlink subframe set.

According to the foregoing steps, content transmitted in the second feedback information may be determined based on a probability of successfully transmitting the first feedback information. This not only can ensure transmission of the first feedback information, but also can reduce as many overheads as possible for transmitting the second feedback information in the second uplink subframe.

In an optional implementation, the method further includes:

The terminal device determines a third uplink subframe associated with a third downlink subframe set, where the third downlink subframe set belongs to the at least one downlink burst, the third downlink subframe set does not overlap with the first downlink subframe set, the third uplink subframe is used to send third feedback information corresponding to downlink data in the third downlink subframe set, the third uplink subframe is in the first uplink burst or the third uplink subframe is in an uplink burst following the first uplink burst, and the third uplink subframe follows the first uplink subframe;

the terminal device determines a third feedback information codebook, and determines the third feedback information based on the third feedback information codebook;

the terminal device determines a third uplink channel in the third uplink subframe; and the terminal device sends the third feedback information to the access network device on the third uplink channel.

Figure 4O:
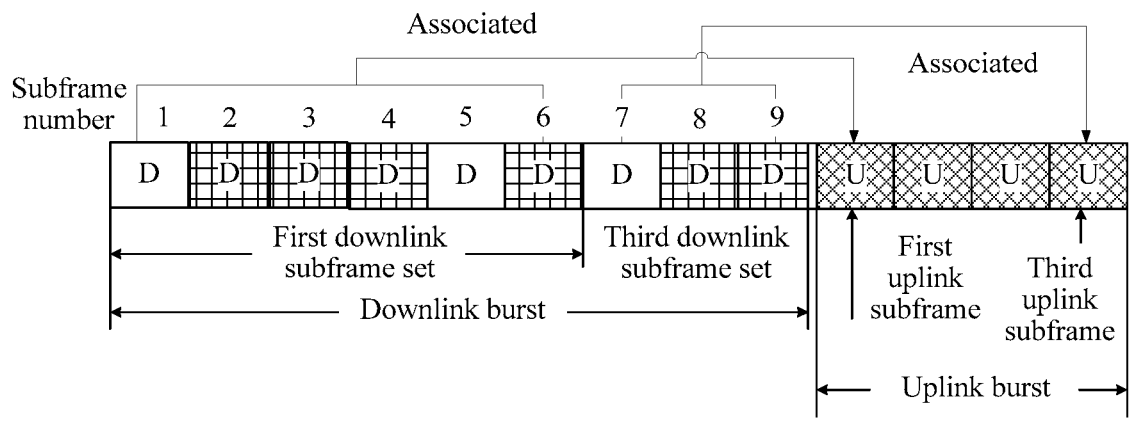
FIG. 4O is a schematic diagram of an association relationship between a third downlink subframe set and a third uplink subframe according to an embodiment of the present invention.

In this embodiment of the present invention, a relationship between the first downlink subframe set and the third downlink subframe set and a relationship between the first uplink subframe and the third uplink subframe may be shown in FIG. 4O.

According to the foregoing steps, feedback information corresponding to downlink data included in the at least one downlink burst may be fed back in the third uplink subframe in addition to the first uplink subframe. Compared with that all feedback information corresponding to the downlink data included in the at least one downlink burst is fed back in the first uplink subframe, this can reduce overheads of feedback information included in the first uplink subframe, and can ensure, as much as possible, transmission of the feedback information corresponding to the downlink data included in the at least one downlink burst. This is because if all feedback information corresponding to the downlink data included in the at least one downlink burst is fed back in the first uplink subframe, and the terminal device does not obtain an unlicensed frequency band resource through contention in the first uplink subframe, the feedback information corresponding to the downlink data included in the at least one downlink burst cannot be transmitted. In this case, the terminal device determines the third uplink subframe. This can ensure, as much as possible, transmission of some feedback information corresponding to the downlink data included in the at least one downlink burst.

In an optional implementation, before the terminal device sends the third feedback information to the access network device on the third uplink channel, the method further includes:

The terminal device receives overlapping codebook indication information sent by the access network device; and the terminal device determines, based on the overlapping codebook indication information, the third downlink subframe set associated with the third uplink subframe.

Optionally, that the terminal device determines, based on the overlapping codebook indication information, the third downlink subframe set associated with the third uplink subframe may further include: The terminal device determines, based on the overlapping codebook indication information, that the third downlink subframe set includes all downlink subframes that meet a HARQ timing relationship with the third uplink subframe and that are in a downlink burst, excluding the first downlink subframe set, in which a downlink subframe of the overlapping codebook indication information is located. The HARQ timing relationship herein may be understood as follows: If the third uplink subframe is denoted by a subframe n, and a subframe that is in the downlink burst and that meets the HARQ timing relationship with the third uplink subframe is denoted by a subframe m, a result of n−m is not less than 4. That a shorter HARQ timing relationship is defined in a future LTE system is not precluded herein. For example, the result of n−m may be alternatively not less than N, where N is a natural number less than 4. Alternatively, that the terminal device determines, based on the overlapping codebook indication information, the third downlink subframe set associated with the third uplink subframe may further include: If an uplink burst in which the third uplink subframe is located is the first uplink burst, the terminal device determines, based on the overlapping codebook indication information, that all downlink subframes associated with uplink subframes in the first uplink burst except the first uplink subframe in the first uplink burst are downlink subframes included in the third downlink subframe set.

Optionally, the overlapping codebook indication information may be carried in uplink scheduling instruction information that schedules the third uplink subframe, such as a UL grant. For example, the UL grant includes indication information of one bit. When the bit is set to 0 or 1, it indicates that the third feedback information fed back in the third uplink subframe does not need to include the first feedback information. In other words, the third downlink subframe set associated with the third uplink subframe does not include any downlink subframe in the first downlink subframe set.

Alternatively, in this embodiment of the present invention, the overlapping codebook indication information may be implicitly indicated instead of being sent by the access network device. For example, if the terminal device does not need to determine, through CCA before the first uplink subframe, whether the first feedback information can be sent in the first uplink subframe, the terminal device may determine that the third feedback information associated with the third uplink subframe does not need to include any content of the first feedback information. Alternatively, for another example, if the terminal device does not need to determine, through CCA, whether an unlicensed spectrum resource is available before determining to transmit the first feedback information in the first uplink subframe, the terminal device may determine that the third feedback information in the third uplink subframe does not include the feedback information corresponding to the downlink data in the first downlink subframe set. For example, when the first uplink subframe is a first uplink subframe following a downlink burst, the terminal device may not perform CCA when transmitting the first feedback information in the first uplink subframe. This ensures an opportunity of transmitting the first feedback information. The terminal device may not transmit the first feedback information in the third uplink subframe. The "downlink burst" herein may be a downlink burst included in the at least one downlink burst in which the first downlink subframe set is located.

It should be noted that the uplink burst in which the third uplink subframe is located may be the same as or different from the uplink burst in which the first uplink subframe is located. The third uplink subframe may be a last or a penultimate uplink subframe in the uplink burst in which the third uplink subframe is located. When the uplink burst in which the third uplink subframe is located and the uplink burst in which the first uplink subframe is located are not a same uplink burst, the third uplink subframe may be alternatively a first uplink subframe in the uplink burst in which the third uplink subframe is located. Alternatively, optionally, the third uplink subframe is an uplink subframe in which a length of a time period used for uplink data or information transmission is not less than a specific threshold. This is not specifically limited in the present invention.

According to the foregoing steps, content transmitted in the third feedback information may be determined based on the probability of successfully transmitting the first feedback information. This can reduce as many overheads as possible for transmitting the third feedback information in the third uplink subframe.

In this embodiment of the present invention, in an optional implementation, the terminal device determines a fourth uplink subframe, and determines, based on overlapping codebook indication information corresponding to the fourth uplink subframe, whether a fourth downlink subframe set associated with the fourth uplink subframe includes the first downlink subframe set. In other words, the terminal device determines the fourth uplink subframe, and determines, based on the overlapping codebook indication information corresponding to the fourth uplink subframe, whether feedback information transmitted in the fourth uplink subframe includes the first feedback information. Optionally, characteristics of the fourth uplink subframe may be similar to those of the second uplink subframe, except for "being associated with the second downlink subframe set, where the first downlink subframe set is a subset of the second downlink subframe set". For example, the fourth uplink subframe may be a last or a penultimate subframe in an uplink burst in which the first uplink subframe is located. Alternatively, the fourth uplink subframe and the first uplink subframe are in a same uplink burst.

It should be noted that an uplink burst in which the fourth uplink subframe is located may be the same as or different from the uplink burst in which the first uplink subframe is located. The fourth uplink subframe may be a last or a penultimate uplink subframe in the uplink burst in which the fourth uplink subframe is located. When the uplink burst in which the fourth uplink subframe is located and the uplink burst in which the first uplink subframe is located are not a same uplink burst, the fourth uplink subframe may be alternatively a first uplink subframe in the uplink burst in which the fourth uplink subframe is located. Alternatively, optionally, the fourth uplink subframe is an uplink subframe in which a length of a time period used for uplink data or information transmission is not less than a specific threshold. This is not specifically limited in the present invention.

In an optional implementation, before the terminal device sends the first feedback information to the access network device on the first uplink channel, the method further includes:

The terminal device receives feedback information bearer indication information sent by the access network device, where the feedback information bearer indication information is used to indicate whether the terminal device sends the first feedback information on the first uplink channel.

For example, if a plurality of consecutive UL subframes are scheduled for the terminal device, even if a HARQ-ACK corresponding to downlink data may be fed back in each uplink subframe, the feedback information bearer indication information may be used to instruct the terminal device to perform feedback in a last UL subframe. As shown in FIG. 4F, each downlink subframe in a corresponding downlink burst is corresponding to one uplink subframe in which a HARQ-ACK may be fed back. However, from a perspective of resource overheads, the access network device may use the feedback information bearer indication information to indicate, to the terminal device, which uplink subframes include HARQ-ACK feedback resources. Feedback information in the existing LTE system is usually transmitted in a PUCCH of an uplink subframe. The PUCCH usually occupies one resource block (RB) in frequency domain. In this case, resource overheads are not high considering that one 20 MHz carrier includes 100 resource blocks in frequency domain. However, information sending on a carrier of an unlicensed spectrum needs to occupy a proportion of frequency domain resources. For example, one time of information sending by an access network device or a terminal device on a carrier of an unlicensed spectrum needs to occupy at least 80% of a frequency domain resource range. For example, the carrier includes a total of 100 resource blocks, and 80% of the frequency domain resource range needs to be occupied. In addition, information sending in the unlicensed spectrum is further limited by power spectrum density. A transmit power in a bandwidth of 1 MHz usually cannot exceed 10 dBm. Therefore, to improve information sending power efficiency and the frequency domain resource occupancy range of 80%, a frequency domain resource occupancy manner is that one physical uplink control channel occupies 10 resource blocks. An adjacent resource block interval of the 10 resource blocks is 10 resource blocks in frequency domain. Consequently, resource occupancy overheads of one physical uplink control channel in the unlicensed spectrum significantly increase compared with those in the existing LTE system. The access network device specifies a time sequence location for sending feedback information, to prevent the terminal device from sending the feedback information in all uplink subframes in which the feedback information can be sent, thereby saving resources.

Optionally, the feedback information bearer indication information may be carried in a UL grant, or may be carried in common control signaling, for example, be carried in a downlink subframe included in one downlink burst or a plurality of downlink bursts prior to the uplink burst in which the first uplink subframe is located; for another example, be carried in a last or a penultimate downlink subframe included in one downlink burst or a plurality of downlink bursts prior to the uplink burst in which the first uplink subframe is located. Optionally, the common control signaling may be further used to indicate an end moment of a downlink burst including the common control signaling.

According to the foregoing steps, resource overheads for transmitting the first feedback information in the first uplink subframe can be reduced, and data transmission efficiency can be ensured.

It should be noted that the second uplink subframe, the third uplink subframe, and the fourth uplink subframe may have same indication information. To be specific, in an optional implementation, before the terminal device sends the second feedback information to the access network device on the second uplink channel, the method further includes:

The terminal device receives feedback information bearer indication information sent by the access network device, where the feedback information bearer indication information is used to indicate whether the terminal device sends the second feedback information on the second uplink channel.

In an optional implementation, before the terminal device sends the third feedback information to the access network device on the third uplink channel, the method further includes:

The terminal device receives feedback information bearer indication information sent by the access network device, where the feedback information bearer indication information is used to indicate whether the terminal device sends the third feedback information on the third uplink channel.

In an optional implementation, before the terminal device sends a fourth feedback information to the access network device on the fourth uplink channel, the method further includes:

The terminal device receives feedback information bearer indication information sent by the access network device, where the feedback information bearer indication information is used to indicate whether the terminal device sends the fourth feedback information on the fourth uplink channel.

In addition, descriptions similar to subframe configuration indication information described below also exist for the second uplink subframe, the third uplink subframe, and the fourth uplink subframe.

In an optional implementation, that the terminal device determines that a first downlink subframe set is associated with a first uplink subframe includes:

The terminal device determines, based on downlink subframe configuration indication information corresponding to each of the at least one downlink burst and a timing relationship between downlink data and feedback information, that the first downlink subframe set is associated with the first uplink subframe.

In an optional implementation, that the terminal device determines that a second downlink subframe set is associated with a second uplink subframe includes:

The terminal device determines, based on downlink subframe configuration indication information corresponding to each of the at least one downlink burst and a timing relationship between downlink data and feedback information, that the second downlink subframe set is associated with the second uplink subframe.

In an optional implementation, that the terminal device determines that a third downlink subframe set is associated with a third uplink subframe includes:

The terminal device determines, based on downlink subframe configuration indication information corresponding to each of the at least one downlink burst and a timing relationship between downlink data and feedback information, that the third downlink subframe set is associated with the third uplink subframe.

Description below is performed by using an example in which the terminal device determines, based on the downlink subframe configuration indication information corresponding to each of the at least one downlink burst and the timing relationship between downlink data and feedback information, that the first downlink subframe set is associated with the first uplink subframe.

In this embodiment of the present invention, that the terminal device determines, based on the downlink subframe configuration indication information corresponding to each of the at least one downlink burst and the timing relationship between downlink data and feedback information, that the first downlink subframe set is associated with the first uplink subframe may include: The terminal device determines, based on the downlink subframe configuration indication information corresponding to each of the at least one downlink burst and the timing relationship between downlink data and feedback information, the first downlink subframe set associated with the first uplink subframe; or the terminal device determines, based on the downlink subframe configuration indication information corresponding to each of the at least one downlink burst and the timing relationship between downlink data and feedback information, the first uplink subframe associated with the first downlink subframe set.

Figure 4P:
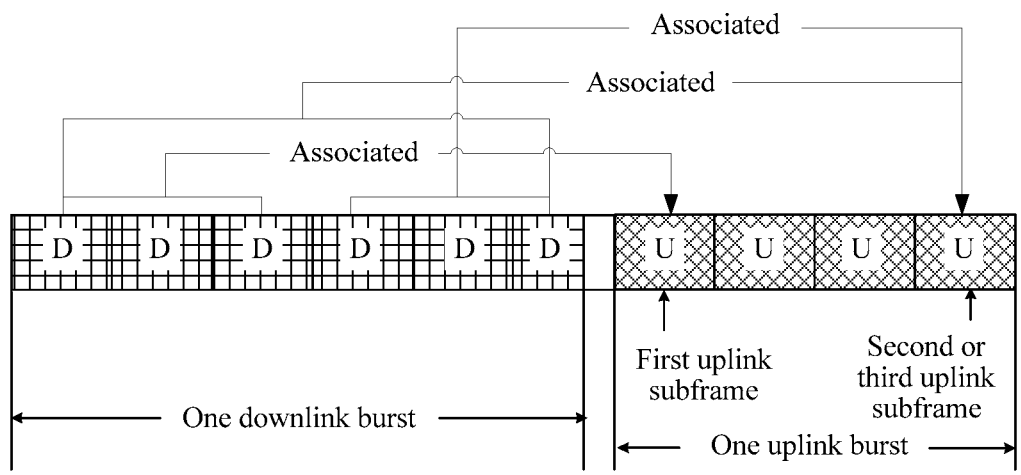
FIG. 4P is a schematic diagram of an association relationship between a downlink subframe set and an uplink subframe according to an embodiment of the present invention.
Figure 4Q:
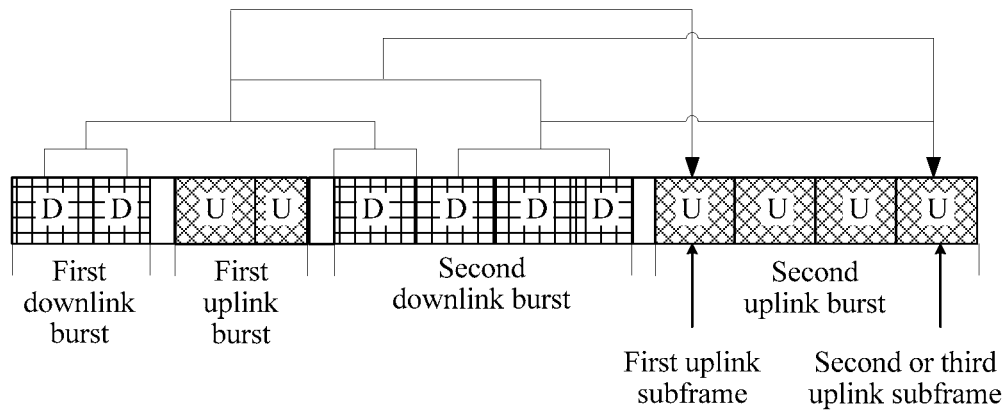
FIG. 4Q is a schematic diagram of another association relationship between a downlink subframe set and an uplink subframe according to an embodiment of the present invention.

In this embodiment of the present invention, in an optional implementation, the downlink subframe configuration indication information is used to indicate a quantity of all downlink subframes included in a downlink burst corresponding to the downlink subframe configuration indication information. Herein, the downlink burst corresponding to the downlink subframe configuration indication information may be a downlink burst including the downlink subframe configuration indication information. A length of a time period used for downlink data transmission in a downlink subframe included in the downlink burst may be equal to the time length of one downlink subframe, for example, 1 ms. The length of the time period used for downlink data transmission may be alternatively less than the time length of one downlink subframe, for example, be less than 1 ms. As shown in FIG. 4P and FIG. 4Q, a length of a time period used for downlink data transmission or downlink information transmission in a last downlink subframe included in a downlink burst is less than the time length of one downlink subframe.

The downlink subframe configuration indication information is used to indicate the quantity of all downlink subframes or all the downlink subframes included in the downlink burst corresponding to the downlink subframe configuration indication information. Indicating all downlink subframes may include indicating a time location of a downlink subframe. The time location of the downlink subframe may be denoted by a subframe number of the downlink subframe. In FIG. 4P, the terminal device may receive the downlink subframe configuration indication information in one or more subframes in a downlink burst shown in FIG. 4P. The downlink subframe configuration indication information indicates that the downlink burst includes six downlink subframes. Optionally, after determining the first uplink subframe, the terminal device may use, based on the HARQ timing relationship, all downlink subframes prior to the first uplink subframe that meet the HARQ timing relationship with the first uplink subframe as the first downlink subframe set associated with the first uplink subframe. In FIG. 4P, assuming that the terminal device determines that a first uplink subframe in an uplink burst is the first uplink subframe, the terminal device may determine that a first, a second, and a third downlink subframes included in a downlink burst are downlink subframes included in the first downlink subframe set associated with the first uplink subframe. Further, the terminal device may determine another uplink subframe in the same uplink burst as the first uplink subframe. The another uplink subframe may also be used to feed back feedback information, namely, HARQ-ACK information, corresponding to downlink data included in a downlink burst shown in FIG. 4P. Whether the HARQ-ACK information fed back in the uplink subframe includes HARQ-ACK information corresponding to the downlink data in the first downlink subframe set may be indicated by using explicit signaling or may be learned in an implicit manner. For example, the terminal device may determine whether the uplink subframe is the second uplink subframe or the third uplink subframe based on the overlapping codebook indication information.

For another example, if the terminal device determines that the second uplink subframe is a last uplink subframe in an uplink burst, the terminal device may determine, based on the HARQ timing relationship and with reference to the downlink subframe configuration indication information, that a first, a second, a third, a fourth, a fifth, and a sixth downlink subframes included in a downlink burst are all downlink subframes included in the second downlink subframe set associated with the second uplink subframe. Alternatively, optionally, if the terminal device determines that the third uplink subframe is a last uplink subframe in an uplink burst, the terminal device may determine that the downlink burst including the downlink subframe configuration indication information includes six downlink subframes based on the HARQ timing relationship and with reference to the downlink subframe configuration indication information. The terminal device may exclude downlink subframes belonging to the first downlink subframe set (that is, a first, a second, and a third downlink subframes) from the six downlink subframes, and use remaining downlink subframes, that is, a fourth, a fifth, and a sixth downlink subframes included in a downlink burst in FIG. 4P, as the third downlink subframe set associated with the third uplink subframe.

In FIG. 4P, the terminal device may receive the downlink subframe configuration indication information in one or more subframes in a downlink burst shown in FIG. 4P. The downlink subframe configuration indication information indicates that the downlink burst includes six downlink subframes. The terminal device determines, based on the downlink subframe configuration indication information, that the downlink burst includes six downlink subframes. If the terminal device determines that the first, the second, and the third downlink subframes in the six downlink subframes are downlink subframes included in the first downlink subframe set, considering HARQ timing relationship, the terminal device may determine a latest uplink subframe meeting the HARQ timing with the third downlink subframe as the first uplink subframe. For example, in FIG. 4P, it is considered that the HARQ timing is 4 ms. Further, optionally, if the terminal device determines that the six downlink subframes are downlink subframes included in the second downlink subframe set, considering the HARQ timing, the terminal device may determine a latest uplink subframe meeting the HARQ timing with the sixth downlink subframe as the second uplink subframe. Alternatively, if the terminal device determines that a fourth, a fifth, and a sixth downlink subframes included in a downlink burst are downlink subframes included in the third downlink subframe set, considering the HARQ timing, the terminal device may determine a latest uplink subframe meeting the HARQ timing with the sixth downlink subframe as the third uplink subframe.

FIG. 4Q provides another association relationship between a downlink subframe set and an uplink subframe. In an optional implementation, in FIG. 4Q, the terminal device determines that a first downlink burst includes two downlink subframes and a second downlink burst includes four downlink subframes based on downlink subframe configuration indication information included in the first downlink burst and that included in the second downlink burst. If the terminal device may determine that a first uplink subframe in the second uplink burst is the first uplink subframe, the terminal device may determine, based on the HARQ timing relationship and with reference to the downlink subframe configuration indication information, that the two downlink subframes included in the first downlink burst and a first downlink subframe included in the second downlink burst are downlink subframes included in the first downlink subframe set associated with the first uplink subframe. If the terminal device determines that a last uplink subframe in the second uplink burst is a subframe in which a HARQ-ACK can be fed back, the terminal device may determine, based on the HARQ timing relationship, that downlink subframes associated with the last uplink subframe include the two downlink subframes in the first downlink burst and the four downlink subframes in the second downlink burst. In this case, the last uplink subframe may be corresponding to the second uplink subframe in this embodiment of the present invention. Alternatively, the terminal device may determine that the downlink subframes associated with the last uplink subframe include a second, a third, and a fourth downlink subframes in the second downlink burst. In this case, the last uplink subframe may be corresponding to the third uplink subframe in this embodiment of the present invention. A structure form in FIG. 4Q is also applicable to a case in which the terminal device determines, based on the downlink subframe configuration indication information and the HARQ timing relationship, the first (or the second or the third) uplink subframe associated with the first (or the second or the third) downlink subframe set. This is not specifically limited herein.

Compared with that the terminal device detects whether there is a reference signal (such as a cell-specific reference signal (CRS)) to determine a quantity of downlink subframes included in a downlink burst, using the downlink subframe configuration indication information to determine a quantity of downlink subframes included in a downlink burst provides higher transmission reliability. This can ensure that the access network device and the terminal device have a consistent understanding of the quantity of downlink subframes included in the downlink burst, and further ensure that the terminal device and the access network device have a consistent understanding of HARQ-ACK information to be fed back for downlink data in a downlink subframe.

In this embodiment of the present invention, in another optional implementation, the downlink subframe configuration indication information is further used to indicate a quantity of some downlink subframes or some downlink subframes in the downlink burst corresponding to the downlink subframe configuration indication information. Indicating some downlink subframes may include indicating time locations of the downlink subframes. The time locations of the downlink subframes may be denoted by subframe numbers corresponding to the downlink subframes. For example, assuming that the downlink burst including the downlink subframe configuration indication information is the first downlink burst, and a subframe including the downlink subframe configuration indication information is a subframe n, the downlink subframe configuration indication information may be further used to indicate a quantity of subframes from a first downlink subframe included in the first downlink burst to the subframe n. Further, optionally, the downlink subframe configuration indication information may be further used to indicate the first downlink subframe set. For example, in FIG. 4P, assuming that the terminal device receives the downlink subframe configuration indication information in a fourth downlink subframe in a downlink burst, the downlink subframe configuration indication information may be used to indicate that the downlink burst includes four downlink subframes. Further, optionally, the terminal device may use the four downlink subframes as the first downlink subframe set. If the terminal device receives the downlink subframe configuration indication information in a fifth downlink subframe in a downlink burst, the downlink subframe configuration indication information may be used to indicate that the downlink burst includes five downlink subframes. Another information determined based on the downlink subframe configuration indication information and a timing relationship of feedback information (for example, the HARQ timing relationship) is the same as described above. Details are not described herein. It should be noted that, in this embodiment of the present invention, the timing relationship between downlink data and feedback information may be preconfigured, or may be notified by the access network device. This is not specifically limited.

In this embodiment of the present invention, in another optional implementation, the downlink subframe configuration indication information is further used to indicate a downlink burst in which the downlink subframe configuration indication information is located. For example, the downlink subframe configuration indication information may be used to indicate a start location and/or an end location of the downlink burst in which the downlink subframe configuration indication information is located. By receiving the downlink subframe configuration indication information, the terminal device may identify the downlink burst in which the downlink subframe configuration indication information is located. For example, as shown in FIG. 4P, assuming that the terminal device receives the downlink subframe configuration indication information in a last downlink subframe of a downlink burst, and the downlink subframe configuration indication information indicates that the downlink burst includes six downlink subframes, the terminal device may determine that a start location of the downlink burst is a corresponding time location that is prior to a subframe start boundary of the last downlink subframe and that is five subframes (or 5 ms) earlier than the subframe start boundary.

In this embodiment of the present invention, in another optional implementation, the downlink subframe configuration indication information is further used to indicate the first downlink subframe set.

It should be noted that downlink subframe configuration indication information corresponding to each downlink burst and the timing relationship between downlink data and feedback information are used to determine that the first downlink subframe set is associated with the first uplink subframe. This determining method is also applicable to determining that the second downlink subframe set is associated with the second uplink subframe, and is also applicable to determining that the third downlink subframe set is associated with the third uplink subframe.

According to the foregoing steps, the terminal device can reliably detect the first downlink subframe set, and can further transmit correct first feedback information in the first uplink subframe.

Optionally, the downlink subframe configuration indication information is included in a last downlink subframe and/or a penultimate downlink subframe in each of the at least one downlink burst. An advantage of this practice is that this may be better applicable to a flexible uplink/downlink configuration in the unlicensed spectrum. This is because carrying the downlink subframe configuration indication information in the last downlink subframe and/or the penultimate downlink subframe can maximize a change in a quantity of downlink subframes of the downlink burst corresponding to the downlink subframe configuration indication information.

Optionally, the downlink subframe configuration indication information is carried in physical layer common control signaling. Further, optionally, the physical layer common control information may be further used to indicate an end moment of the downlink burst corresponding to the downlink subframe configuration indication information. For example, a cell common RNTI radio network temporary identifier (CC-RNTI) may be used for scrambling.

Optionally, the downlink subframe configuration indication information is used to indicate the quantity of downlink subframes in the downlink burst in which the downlink subframe configuration indication information is located.

According to the foregoing steps, the terminal device determines, based on the received first downlink subframe set, the first uplink subframe associated with the first downlink subframe set, and further transmits, in the first uplink subframe, the feedback information corresponding to the first downlink subframe set. This can meet a flexible uplink/downlink configuration in a U-LTE system, and can ensure that the terminal device properly sends ACK/NACK feedback information in a U-LTE scenario. In addition, the first uplink subframe carries feedback information corresponding to a plurality of pieces of downlink data, thereby improving transmission resource utilization and avoiding wasting resources.

To facilitate implementation of the feedback information transmission method in the embodiments of the present invention, the present invention further provides a related device for implementing the method.

Figure 5:
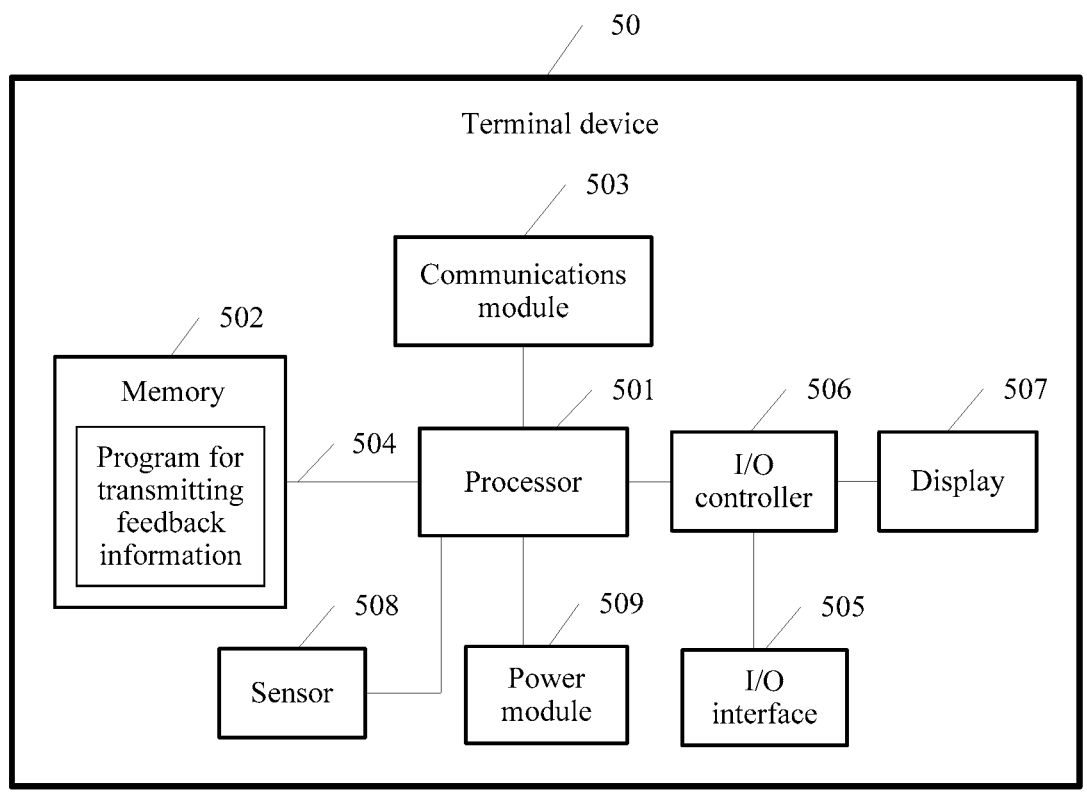
FIG. 5 is a schematic structural diagram of a terminal device according to an embodiment of the present invention.

Referring to FIG. 5, FIG. 5 is a schematic structural diagram of a terminal device according to an embodiment of the present invention. As shown in FIG. 5, a terminal device 50 includes a processor 501, a memory 502, a communications module 503, and a bus 504. The processor 501, the memory 502, and the communications module 503 may be connected by using a bus or in another manner. In FIG. 5, connection using the bus 504 is used as an example.

Optionally, the terminal device 50 may further include: an input/output (I/O) interface 505, an I/O controller 506, a display 507, a sensor 508, and a power module 509.

The processor 501 may be a general purpose processor such as a central processing unit (CPU), configured to run operating system software, required application program software, and the like of the terminal device 50. The processor 501 may process data received by using the communications module 503. The processor 501 may further process data to be sent to the communications module 503 for wireless transmission.

The memory 502 is configured to store program code for transmitting feedback information, and complete storage of various software programs, data storage, software running, and the like of the terminal device. The memory 502 may include a volatile memory such as a random access memory (RAM). The memory 502 may further include a nonvolatile memory, such as a read-only memory (ROM), a hard disk drive (HDD), or a solid-state drive (SSD). The memory 502 may further include a combination of the foregoing memories.

The communications module 503 provides a communication function for the terminal device 50, is configured to perform transmit processing (such as amplification, modulation, and coding) on a mobile communication signal generated by the processor 501, and is further configured to perform receive processing (such as demodulation and decoding) on a mobile communication signal received by an antenna. The communications module 503 may be applicable to a cellular network such as a GSM, UMTS, LTE, or CDMA network, and may also be applicable to one or more of networks such as a WLAN, a near field communication (NFC) network, and a Bluetooth network.

The bus 504 may be an industry standard architecture (ISA) bus, a peripheral component interconnect (PCI) bus, an extended industry standard architecture (EISA) bus, an inter integrated circuit (ITC), or the like.

The I/O interface 505 is an external interface of the terminal device 50, including one or more of a universal serial bus (USB) interface, a secure digital (SD) card interface, a button interface, and the like.

The I/O controller 506 is configured to control data interaction between various input and output devices in the terminal device 50, particularly including data interaction between the processor 501 and the I/O interface 505 and between the processor 501 and the display 507.

The display 507 is a display and a touchscreen of the terminal device 50. The display 507 is configured to display a software running status, a power status, a time point, a user configuration interface, and a configuration result of the terminal device 50. The touchscreen is configured to receive a user touch operation and convert the user touch operation into a user operation instruction.

The sensor 508 is any sensor device, including one or more of a Global Positioning System (GPS) module, a gravity sensor, an acceleration sensor, a distance sensor, a camera, an optical sensor, and the like.

The power module 509 supplies power to each module of the terminal device 50.

In this embodiment of the present invention, the processor 501 is mainly configured to invoke a program stored in the memory 502, to perform the following operations:

the processor 501 receives, by using the communications module 503 in a downlink subframe of at least one downlink burst, downlink data sent by an access network device;

the processor 501 determines that a first downlink subframe set is associated with a first uplink subframe, where the first downlink subframe set belongs to the at least one downlink burst, the first uplink subframe is used to send first feedback information corresponding to downlink data in the first downlink subframe set, the first uplink subframe is in a first uplink burst, and the first uplink burst follows the at least one downlink burst;

the processor 501 determines a first feedback information codebook, and determines the first feedback information based on the first feedback information codebook;

the processor 501 determines a first uplink channel in the first uplink subframe; and the processor 501 sends the first feedback information to the access network device by using the communications module 503 on the first uplink channel.

Optionally, the processor 501 is further configured to:

determine, by the processor 501, that a second downlink subframe set is associated with a second uplink subframe, where the second downlink subframe set belongs to the at least one downlink burst, the first downlink subframe set is a subset of the second downlink subframe set, the second uplink subframe is used to send second feedback information corresponding to downlink data in the second downlink subframe set, the second uplink subframe is in the first uplink burst, and the second uplink subframe follows the first uplink subframe;

determine, by the processor 501, a second feedback information codebook, and determine the second feedback information based on the second feedback information codebook;

determine, by the processor 501, a second uplink channel in the second uplink subframe; and send, by the processor 501, the second feedback information to the access network device by using the communications module 503 on the second uplink channel.

Optionally, before the processor 501 sends the second feedback information to the access network device by using the communications module 503 on the second uplink channel, the processor 501 is further configured to:

receive, by the processor 501 by using the communications module 503, overlapping codebook indication information sent by the access network device; and determine, by the processor 501 based on the overlapping codebook indication information, the second downlink subframe set associated with the second uplink subframe.

Optionally, the processor 501 is further configured to:

determine, by the processor 501, that a third downlink subframe set is associated with a third uplink subframe, where the third downlink subframe set belongs to the at least one downlink burst, the third downlink subframe set does not overlap with the first downlink subframe set, the third uplink subframe is used to send third feedback information corresponding to downlink data in the third downlink subframe set, the third uplink subframe is in the first uplink burst or the third uplink subframe is in an uplink burst following the first uplink burst, and the third uplink subframe follows the first uplink subframe;

determine, by the processor 501, a third feedback information codebook, and determine the third feedback information based on the third feedback information codebook;

determine, by the processor 501, a third uplink channel in the third uplink subframe; and send, by the processor 501, the third feedback information to the access network device by using the communications module 503 on the third uplink channel.

Optionally, before the processor 501 sends the third feedback information to the access network device by using the communications module 503 on the third uplink channel, the processor 501 is further configured to:

receive, by the processor 501 by using the communications module 503, overlapping codebook indication information sent by the access network device; and determine, by the processor 501 based on the overlapping codebook indication information, the third downlink subframe set associated with the third uplink subframe.

Optionally, before the processor 501 sends the first feedback information to the access network device by using the communications module 503 on the first uplink channel, the processor 501 is further configured to:

receive, by the processor 501 by using the communications module 503, feedback information bearer indication information sent by the access network device, where the feedback information bearer indication information is used to indicate whether the terminal device sends the first feedback information on the first uplink channel.

Optionally, that the processor 501 determines that a first downlink subframe set is associated with a first uplink subframe includes:

The processor 501 determines, based on downlink subframe configuration indication information corresponding to each of the at least one downlink burst and a timing relationship between downlink data and feedback information, that the first downlink subframe set is associated with the first uplink subframe.

Optionally, the downlink subframe configuration indication information is included in a last downlink subframe and/or a penultimate downlink subframe in each of the at least one downlink burst.

Optionally, the downlink subframe configuration indication information is used to indicate a quantity of downlink subframes in a downlink burst in which the downlink subframe configuration indication information is located.

It should be noted that, for a function of each function module in the terminal device 50 described in this embodiment of the present invention, refer to the related description of the corresponding terminal device in the embodiment shown in FIG. 3. Details are not described herein again.

Figure 6:
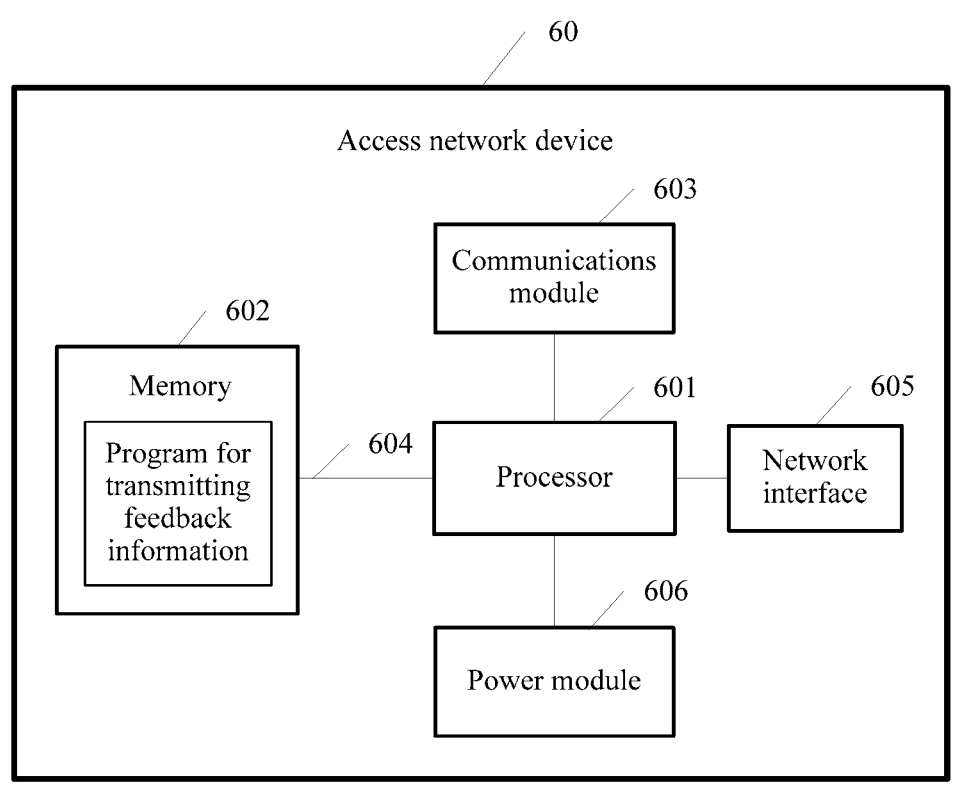
FIG. 6 is a schematic structural diagram of an access network device according to an embodiment of the present invention.

Referring to FIG. 6, FIG. 6 is a schematic structural diagram of an access network device according to an embodiment of the present invention. As shown in FIG. 6, a access network device 60 includes a processor 601, a memory 602, a communications module 603, and a bus 604. The processor 601, the memory 602, and the communications module 603 may be connected by using a bus or in another manner. In FIG. 6, connection using the bus 604 is used as an example.

Optionally, the access network device 60 may further include a network interface 605 and a power module 606.

The processor 601 may be a digital signal processing (DSP) chip. The processor 601 is configured to manage a radio channel, control an inter-cell handover of a terminal device in a local control area, and the like. In specific implementation, the processor 601 may include modules such as an AM/CM module (used as a center for speech channel switch and information exchange), a BM module (configured to perform call processing, signaling processing, radio resource management, radio link management, and circuit maintenance functions), and a TCSM module (configured to perform multiplexing, demultiplexing, and code conversion functions). For specific information, refer to knowledge about mobile communications.

The memory 602 is configured to store program code for transmitting feedback information. In specific implementation, the memory 602 may use a ROM or a RAM, and may be configured to store program code.

The communications module 603 is configured to perform transmit processing (such as modulation) on a mobile communication signal generated by the processor 601, and is further configured to perform receive processing (such as demodulation) on a mobile communication signal received by an antenna.

The bus 604 may be an ISA bus, a PCI bus, an EISA bus, an IIC bus, or the like.

The network interface 605 is used by the access network device 60 to perform data communication with a terminal (a mobile console MS in 2G and UE in 3G and 4G). In specific implementation, the network interface 605 may include one or more of a GSM (2G) wireless network interface, a WCDMA (3G) wireless network interface, an LTE (4G) wireless network interface, and the like, or may be a wireless network interface in future 4.5G or 5G.

The power module 606 supplies power to each module of the access network device 60.

In this embodiment of the present invention, the processor 601 is further configured to invoke the program code stored in the memory 602, to perform the following operations:

The processor 601 sends downlink data to a terminal device by using the communications module 603 in a downlink subframe of at least one downlink burst; and the processor 601 receives, by using the communications module 603 on a first uplink channel in a first uplink subframe, first feedback information sent by the terminal device, where the first uplink subframe is associated with a first downlink subframe set, the first downlink subframe set belongs to the at least one downlink burst, the first feedback information is corresponding to downlink data in the first downlink subframe set, the first uplink subframe is in a first uplink burst, and the first uplink burst follows the at least one downlink burst.

It should be noted that the access network device 60 may be applied to a 2G communications system (for example, GSM), a 3G communications system (for example, UMTS), a 4G communications system (LTE), or a future 4.5G or 5G communications system.

Optionally, the processor 601 is further configured to:

receive, by using the communications module 603 on a second uplink channel in a second uplink subframe, second feedback information sent by the terminal device, where the second uplink subframe is associated with a second downlink subframe set, the second downlink subframe set belongs to the at least one downlink burst, the first downlink subframe set is a subset of the second downlink subframe set, the second feedback information is corresponding to downlink data in the second downlink subframe set, the second uplink subframe is in the first uplink burst, and the second uplink subframe follows the first uplink subframe.

Optionally, before the processor 601 receives, by using the communications module 603 on the second uplink channel in the second uplink subframe, the second feedback information sent by the terminal device, the processor 601 is further configured to:

send overlapping codebook indication information to the terminal device by using the communications module 603, where the overlapping codebook indication information is used by the terminal device to determine the second downlink subframe set associated with the second uplink subframe.

Optionally, the processor 601 is further configured to:

receive, by using the communications module 603 on a third uplink channel in a third uplink subframe, third feedback information sent by the terminal device, where the third uplink subframe is associated with a third downlink subframe set, the third downlink subframe set belongs to the at least one downlink burst, the third downlink subframe set does not overlap with the first downlink subframe set, the third feedback information is corresponding to downlink data in the third downlink subframe set, the third uplink subframe is in the first uplink burst or the third uplink subframe is in an uplink burst following the first uplink burst, and the third uplink subframe follows the first uplink subframe.

Optionally, before the processor 601 receives, by using the communications module 603 on the third uplink channel in the third uplink subframe, the third feedback information sent by the terminal device, the processor 601 is further configured to:

send overlapping codebook indication information to the terminal device by using the communications module 603, where the overlapping codebook indication information is used by the terminal device to determine the third downlink subframe set associated with the third uplink subframe.

Optionally, before the processor 601 receives, by using the communications module 603 on the first uplink channel in the first uplink subframe, the first feedback information sent by the terminal device, the processor 601 is further configured to:

send feedback information bearer indication information to the terminal device by using the communications module 603, where the feedback information bearer indication information is used to indicate whether the terminal device sends the first feedback information on the first uplink channel in the first uplink subframe.

Optionally, the processor 601 is further configured to:

send downlink subframe configuration indication information to the terminal device by using the communications module 603 in a downlink subframe in each of the at least one downlink burst, where the downlink subframe configuration indication information is used by the terminal device to determine, based on the downlink subframe configuration indication information and a timing relationship between downlink data and feedback information, that the first downlink subframe set is associated with the first uplink subframe.

Optionally, the downlink subframe configuration indication information is included in a last downlink subframe and/or a penultimate downlink subframe in each of the at least one downlink burst.

Optionally, the downlink subframe configuration indication information is used to indicate a quantity of downlink subframes in a downlink burst in which the downlink subframe configuration indication information is located.

It should be noted that, for a function of each function module in the access network device 60 described in this embodiment of the present invention, refer to the related description of the corresponding access network device in the embodiment shown in FIG. 3. Details are not described herein again.

Figure 7:
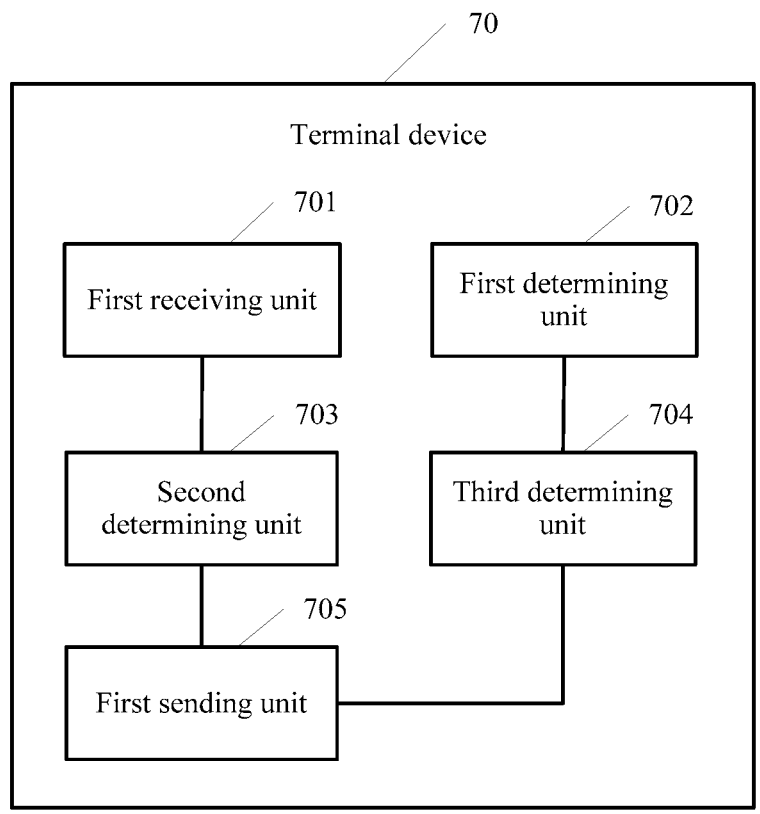
FIG. 7 is a schematic structural diagram of another terminal device according to an embodiment of the present invention.

Referring to FIG. 7, FIG. 7 is a schematic structural diagram of another terminal device according to an embodiment of the present invention. As shown in FIG. 7, a terminal device 70 includes: a first receiving unit 701, a first determining unit 702, a second determining unit 703, a third determining unit 704, and a first sending unit 705.

The first receiving unit 701 is configured to receive, in a downlink subframe of at least one downlink burst, downlink data sent by an access network device.

The first determining unit 702 is configured to determine that a first downlink subframe set is associated with a first uplink subframe, where the first downlink subframe set belongs to the at least one downlink burst, the first uplink subframe is used to send first feedback information corresponding to downlink data in the first downlink subframe set, the first uplink subframe is in a first uplink burst, and the first uplink burst follows the at least one downlink burst.

The second determining unit 703 is configured to determine a first feedback information codebook, and determine the first feedback information based on the first feedback information codebook.

The third determining unit 704 is configured to determine a first uplink channel in the first uplink subframe.

The first sending unit 705 is configured to send the first feedback information to the access network device on the first uplink channel.

In this embodiment, the terminal device 70 is presented in a form of a functional unit. The "unit" herein may be an application-specific integrated circuit (ASIC), a processor and a memory that execute one or more software or firmware programs, an integrated logic circuit, and/or another component that can provide the foregoing function. The terminal device 70 may use a form shown in FIG. 5. The receiving unit 701, the first determining unit 702, the second determining unit 703, the third determining unit 704, and the first sending unit 705 may be implemented by the processor 501 in FIG. 5.

Optionally, the terminal device 70 further includes:

a fourth determining unit, configured to determine that a second downlink subframe set is associated with a second uplink subframe, where the second downlink subframe set belongs to the at least one downlink burst, the first downlink subframe set is a subset of the second downlink subframe set, the second uplink subframe is used to send second feedback information corresponding to downlink data in the second downlink subframe set, the second uplink subframe is in the first uplink burst, and the second uplink subframe follows the first uplink subframe;

a fifth determining unit, configured to determine a second feedback information codebook, and determine the second feedback information based on the second feedback information codebook;

a sixth determining unit, configured to determine a second uplink channel in the second uplink subframe; and a second sending unit, configured to send the second feedback information to the access network device on the second uplink channel.

Optionally, the terminal device 70 further includes:

a second receiving unit, configured to receive overlapping codebook indication information sent by the access network device; and a seventh determining unit, configured to determine, based on the overlapping codebook indication information, the second downlink subframe set associated with the second uplink subframe.

Optionally, the terminal device 70 further includes:

an eighth determining unit, configured to determine that a third downlink subframe set is associated with a third uplink subframe, where the third downlink subframe set belongs to the at least one downlink burst, the third downlink subframe set does not overlap with the first downlink subframe set, the third uplink subframe is used to send third feedback information corresponding to downlink data in the third downlink subframe set, the third uplink subframe is in the first uplink burst or the third uplink subframe is in an uplink burst following the first uplink burst, and the third uplink subframe follows the first uplink subframe;

a ninth determining unit, configured to determine a third feedback information codebook, and determine the third feedback information based on the third feedback information codebook;

a tenth determining unit, configured to determine a third uplink channel in the third uplink subframe; and a third sending unit, configured to send the third feedback information to the access network device on the third uplink channel.

Optionally, the terminal device 70 further includes:

a third receiving unit, configured to receive overlapping codebook indication information sent by the access network device; and an eleventh determining unit, configured to determine, based on the overlapping codebook indication information, the third downlink subframe set associated with the third uplink subframe.

Optionally, the terminal device 70 further includes:

a fourth receiving unit, configured to receive feedback information bearer indication information sent by the access network device, where the feedback information bearer indication information is used to indicate whether the terminal device sends the first feedback information on the first uplink channel.

Optionally, the first determining unit 702 is specifically configured to:

determine, based on downlink subframe configuration indication information corresponding to each of the at least one downlink burst and a timing relationship between downlink data and feedback information, that the first downlink subframe set is associated with the first uplink subframe.

It should be noted that, for a function of each function module in the terminal device 70 described in this embodiment of the present invention, refer to the related description of the terminal device in the embodiment shown in FIG. 3. Details are not described herein again.

Figure 8:
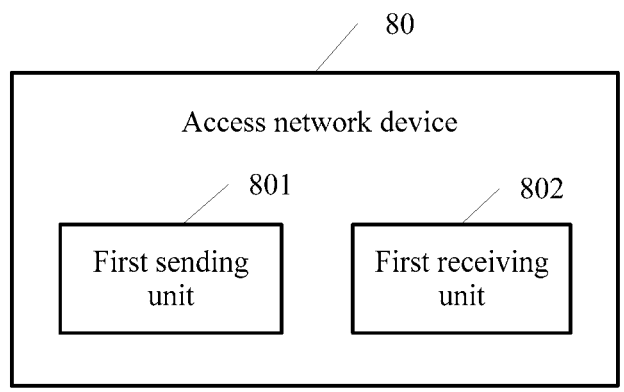
FIG. 8 is a schematic structural diagram of another access network device according to an embodiment of the present invention.

Referring to FIG. 8, FIG. 8 is a schematic structural diagram of an access network device according to an embodiment of the present invention. As shown in FIG. 8, an access network device 80 includes: a first sending unit 801 and a first receiving unit 802.

The first sending unit 801 is configured to send downlink data to a terminal device in a downlink subframe of at least one downlink burst.

The first receiving unit 802 is configured to receive, on a first uplink channel in a first uplink subframe, first feedback information sent by the terminal device, where the first uplink subframe is associated with a first downlink subframe set, the first downlink subframe set belongs to the at least one downlink burst, the first feedback information is corresponding to downlink data in the first downlink subframe set, the first uplink subframe is in a first uplink burst, and the first uplink burst follows the at least one downlink burst.

In this embodiment, the access network device 80 is presented in a form of a functional unit. The "unit" herein may be an ASIC, a processor and a memory that execute one or more software or firmware programs, an integrated logic circuit, and/or another component that can provide the foregoing function. The access network device 80 may use a form shown in FIG. 6. The first sending unit 801 and the first receiving unit 802 may be implemented by the processor 601 in FIG. 6.

Optionally, the access network device 80 further includes:

a second receiving unit, configured to receive, on a second uplink channel in a second uplink subframe, second feedback information sent by the terminal device, where the second uplink subframe is associated with a second downlink subframe set, the second downlink subframe set belongs to the at least one downlink burst, the first downlink subframe set is a subset of the second downlink subframe set, the second feedback information is corresponding to downlink data in the second downlink subframe set, the second uplink subframe is in the first uplink burst, and the second uplink subframe follows the first uplink subframe.

Optionally, the access network device 80 further includes:

a second sending unit, configured to send overlapping codebook indication information to the terminal device, where the overlapping codebook indication information is used by the terminal device to determine the second downlink subframe set associated with the second uplink subframe.

Optionally, the access network device 80 further includes:

a third receiving unit, configured to receive, on a third uplink channel in a third uplink subframe, third feedback information sent by the terminal device, where the third uplink subframe is associated with a third downlink subframe set, the third downlink subframe set belongs to the at least one downlink burst, the third downlink subframe set does not overlap with the first downlink subframe set, the third feedback information is corresponding to downlink data in the third downlink subframe set, the third uplink subframe is in the first uplink burst or the third uplink subframe is in an uplink burst following the first uplink burst, and the third uplink subframe follows the first uplink subframe.

Optionally, the access network device 80 further includes:

a third sending unit, configured to send overlapping codebook indication information to the terminal device, where the overlapping codebook indication information is used by the terminal device to determine the third downlink subframe set associated with the third uplink subframe.

Optionally, the access network device 80 further includes:

a fourth sending unit, configured to send feedback information bearer indication information to the terminal device, where the feedback information bearer indication information is used to indicate whether the terminal device sends the first feedback information on the first uplink channel in the first uplink subframe.

Optionally, the access network device 80 further includes:

a fifth sending unit, configured to send downlink subframe configuration indication information to the terminal device in a downlink subframe in each of the at least one downlink burst, where the downlink subframe configuration indication information is used by the terminal device to determine, based on the downlink subframe configuration indication information and a timing relationship between downlink data and feedback information, that the first downlink subframe set is associated with the first uplink subframe.

It should be noted that, for a function of each function module in the access network device 80 described in this embodiment of the present invention, refer to the related description of the access network device in the embodiment shown in FIG. 3. Details are not described herein again.

To facilitate implementation of the embodiments of the present invention, an embodiment of the present invention further provides a computer readable storage medium. The computer readable storage medium stores one or more computer programs. The computer readable storage medium may be a magnetic disk, an optical disc, a ROM, a RAM, or the like. The one or more computer programs run on one or more processors in a terminal device or an access network device. When the computer programs are running, a procedure of the method embodiment shown in FIG. 3 can be implemented.

To sum up, according to the embodiments of the present invention, the terminal device determines, based on the received first downlink subframe set, the first uplink subframe associated with the first downlink subframe set, and further transmits, in the first uplink subframe, the feedback information corresponding to the first downlink subframe set. This can meet a flexible uplink/downlink configuration in a U-LTE system, and can ensure that the terminal device properly sends ACK/NACK feedback information in a U-LTE scenario. In addition, the first uplink subframe carries feedback information corresponding to a plurality of pieces of downlink data, thereby improving transmission resource utilization and avoiding wasting resources.

Although the present invention is described herein with reference to the embodiments, a protection scope of the present invention should not be limited. In a process of implementing the present invention that claims protection, a person skilled in the art may understand and implement all or some procedures in the foregoing embodiments by viewing the accompanying drawings, disclosed content, and the accompanying claims. Equivalent variations made in accordance with the claims of the present invention shall fall within the scope of the present invention. In the claims, "comprising" does not exclude another component or another step, and "a" or "one" does not exclude a case of multiple. A single controller or another unit may implement several functions enumerated in the claims. Some words are recorded in dependent claims that are different from each other, but this does not mean that these words cannot be combined to produce a good effect. A computer program may be stored/distributed in an appropriate medium such as an optical storage medium or a solid-state medium and be provided together with other hardware or be used as a part of hardware, or may be distributed in another manner, for example, by using the Internet, or another wired or wireless system.

What is claimed is:

1. A feedback information transmission method, comprising:

receiving, by a terminal device in a downlink subframe in at least one downlink burst, downlink data sent by an access network device;

determining, by the terminal device, that a first downlink subframe set is associated with a first uplink subframe, wherein the first downlink subframe set belongs to the at least one downlink burst, wherein the first uplink subframe is used to send first feedback information corresponding to downlink data in the first downlink subframe set, wherein the first uplink subframe is in a first uplink burst, and wherein the first uplink burst follows the at least one downlink burst;

determining, by the terminal device, a first feedback information codebook;

determining, by the terminal device, the first feedback information based on the first feedback information codebook;

determining, by the terminal device, a first uplink channel in the first uplink subframe;

sending, by the terminal device, the first feedback information to the access network device on the first uplink channel;

receiving, by the terminal device, overlapping codebook indication information sent by the access network device;

determining, by the terminal device based on the overlapping codebook indication information, that a second downlink subframe set is associated with a second uplink subframe, wherein the second downlink subframe set belongs to the at least one downlink burst, wherein the first downlink subframe set is a subset of the second downlink subframe set, wherein the second uplink subframe is used to send second feedback information corresponding to downlink data in the second downlink subframe set, wherein the second uplink subframe is in the first uplink burst, and wherein the second uplink subframe follows the first uplink subframe;

determining, by the terminal device, a second feedback information codebook;

determining, by the terminal device, the second feedback information based on the second feedback information codebook;

determining, by the terminal device, a second uplink channel in the second uplink subframe; and sending, by the terminal device, the second feedback information to the access network device on the second uplink channel.

2. The method according to claim 1, further comprising, before the sending, by the terminal device, the first feedback information to the access network device on the first uplink channel:

receiving, by the terminal device, feedback information bearer indication information sent by the access network device, wherein the feedback information bearer indication information is used to indicate whether the terminal device sends the first feedback information on the first uplink channel.

3. The method according to claim 1, wherein the determining, by the terminal device, that a first downlink subframe set is associated with a first uplink subframe comprises:
   determining, by the terminal device based on downlink subframe configuration indication information corresponding to each of the at least one downlink burst and a timing relationship between downlink data and feedback information, that the first downlink subframe set is associated with the first uplink subframe.

4. A feedback information transmission method, comprising:
   sending, by an access network device, downlink data to a terminal device in a downlink subframe in at least one downlink burst;
   receiving, by the access network device on a first uplink channel in a first uplink subframe, first feedback information sent by the terminal device, wherein the first uplink subframe is associated with a first downlink subframe set, wherein the first downlink subframe set belongs to the at least one downlink burst, wherein the first feedback information is corresponding to downlink data in the first downlink subframe set, wherein the first uplink subframe is in a first uplink burst, and wherein the first uplink burst follows the at least one downlink burst;
   sending, by the access network device, overlapping codebook indication information to the terminal device, wherein the overlapping codebook indication information is used by the terminal device to determine a second downlink subframe set associated with a second uplink subframe; and
   receiving, by the access network device on a second uplink channel in the second uplink subframe, second feedback information sent by the terminal device, wherein the second uplink subframe is associated with the second downlink subframe set, wherein the second downlink subframe set belongs to the at least one downlink burst, wherein the first downlink subframe set is a subset of the second downlink subframe set, wherein the second feedback information is corresponding to downlink data in the second downlink subframe set, wherein the second uplink subframe is in the first uplink burst, and wherein the second uplink subframe follows the first uplink subframe.

5. The method according to claim 4, further comprising, before the receiving, by the access network device on a first uplink channel in a first uplink subframe, first feedback information sent by the terminal device:
   sending, by the access network device, feedback information bearer indication information to the terminal device, wherein the feedback information bearer indication information is used to indicate whether the terminal device sends the first feedback information on the first uplink channel in the first uplink subframe.

6. The method according to claim 4, further comprising:
   sending, by the access network device, downlink subframe configuration indication information to the terminal device in a downlink subframe in each of the at least one downlink burst, wherein the downlink subframe configuration indication information is used by the terminal device to determine, based on the downlink subframe configuration indication information and a timing relationship between downlink data and feedback information, that the first downlink subframe set is associated with the first uplink subframe.

7. A terminal device, comprising at least one processor, a memory, and a communications module, wherein the memory is configured to store program code for transmitting feedback information, and wherein the at least one processor is configured to invoke the program code, to perform the following operations:
   receiving, by the processor by using the communications module in a downlink subframe in at least one downlink burst, downlink data sent by an access network device;
   determining, by the at least one processor, that a first downlink subframe set is associated with a first uplink subframe, wherein the first downlink subframe set belongs to the at least one downlink burst, the first uplink subframe is used to send first feedback information corresponding to downlink data in the first downlink subframe set, the first uplink subframe is in a first uplink burst, and the first uplink burst follows the at least one downlink burst;
   determining, by the at least one processor, a first feedback information codebook;
   determining, by the at least one processor, the first feedback information based on the first feedback information codebook;
   determining, by the at least one processor, a first uplink channel in the first uplink subframe;
   sending, by the at least one processor, the first feedback information to the access network device by using the communications module on the first uplink channel;
   receiving, by using the communications module, overlapping codebook indication information sent by the access network device;
   determining, based on the overlapping codebook indication information, that a second downlink subframe set is associated with a second uplink subframe, wherein the second downlink subframe set belongs to the at least one downlink burst, wherein the first downlink subframe set is a subset of the second downlink subframe set, wherein the second uplink subframe is used to send second feedback information corresponding to downlink data in the second downlink subframe set, wherein the second uplink subframe is in the first uplink burst, and wherein the second uplink subframe follows the first uplink subframe;
   determining a second feedback information codebook;
   determining the second feedback information based on the second feedback information codebook;
   determining a second uplink channel in the second uplink subframe; and
   sending the second feedback information to the access network device by using the communications module on the second uplink channel.

8. The terminal device according to claim 7, wherein the at least one processor is further configured to, before the at least one processor sends the first feedback information to the access network device by using the communications module on the first uplink channel:
   receive, by using the communications module, feedback information bearer indication information sent by the access network device, wherein the feedback information bearer indication information is used to indicate whether the terminal device sends the first feedback information on the first uplink channel.

9. The terminal device according to claim 7, wherein the determining, by the at least one processor, that a first downlink subframe set is associated with a first uplink subframe comprises:

determining, by the at least one processor based on downlink subframe configuration indication information corresponding to each of the at least one downlink burst and a timing relationship between downlink data and feedback information, that the first downlink subframe set is associated with the first uplink subframe.

10. An access network device, comprising at least one processor, a memory, and a communications module, wherein the memory is configured to store program code for transmitting feedback information, and the at least one processor is configured to invoke the program code, to perform the following operations:
  sending, by the at least one processor, downlink data to a terminal device by using the communications module in a downlink subframe in at least one downlink burst;
  receiving, by the at least one processor by using the communications module on a first uplink channel in a first uplink subframe, first feedback information sent by the terminal device, wherein the first uplink subframe is associated with a first downlink subframe set, wherein the first downlink subframe set belongs to the at least one downlink burst, wherein the first feedback information is corresponding to downlink data in the first downlink subframe set, wherein the first uplink subframe is in a first uplink burst, and wherein the first uplink burst follows the at least one downlink burst;
  sending overlapping codebook indication information to the terminal device by using the communications module, wherein the overlapping codebook indication information is used by the terminal device to determine a second downlink subframe set associated with a second uplink subframe; and
  receiving, by using the communications module on a second uplink channel in the second uplink subframe, second feedback information sent by the terminal device, wherein the second uplink subframe is associated with the second downlink subframe set, wherein the second downlink subframe set belongs to the at least one downlink burst, wherein the first downlink subframe set is a subset of the second downlink subframe set, wherein the second feedback information is corresponding to downlink data in the second downlink subframe set, wherein the second uplink subframe is in the first uplink burst, and wherein the second uplink subframe follows the first uplink subframe.

11. The access network device according to claim 10, wherein the at least one processor is further configured to, before the at least one processor receives, by using the communications module on the first uplink channel in the first uplink subframe, the first feedback information sent by the terminal device:
  send feedback information bearer indication information to the terminal device by using the communications module, wherein the feedback information bearer indication information is used to indicate whether the terminal device sends the first feedback information on the first uplink channel in the first uplink subframe.

12. The access network device according to claim 10, wherein the at least one processor is further configured to:
  send downlink subframe configuration indication information to the terminal device by using the communications module in a downlink subframe in each of the at least one downlink burst, wherein the downlink subframe configuration indication information is used by the terminal device to determine, based on the downlink subframe configuration indication information and a timing relationship between downlink data and feedback information, that the first downlink subframe set is associated with the first uplink subframe.

* * * * *